(12) United States Patent
Fujimura

(10) Patent No.: US 11,018,987 B2
(45) Date of Patent: May 25, 2021

(54) RESOURCE RESERVATION SYSTEM, SETTING METHOD, AND NON-TRANSITORY COMPUTER READABLE STORAGE MEDIUM

(71) Applicant: Natsumi Fujimura, Kanagawa (JP)

(72) Inventor: Natsumi Fujimura, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 16/744,242

(22) Filed: Jan. 16, 2020

(65) Prior Publication Data

US 2020/0244592 A1 Jul. 30, 2020

(30) Foreign Application Priority Data

Jan. 29, 2019 (JP) .............................. JP2019-013645

(51) Int. Cl.
*H04L 12/911* (2013.01)
*G06F 16/955* (2019.01)
(Continued)

(52) U.S. Cl.
CPC ........ *H04L 47/781* (2013.01); *G06F 16/9566* (2019.01); *H04L 47/788* (2013.01); *H04L 47/828* (2013.01); *H04L 63/102* (2013.01); *H04L 67/02* (2013.01); *H04L 12/1827* (2013.01); *H04L 47/72* (2013.01)

(58) Field of Classification Search
CPC ... H04L 47/72; H04L 47/781; H04L 12/1827; H04L 63/102
See application file for complete search history.

(56) References Cited

U.S. PATENT DOCUMENTS

2010/0161800 A1* 6/2010 Moon .................... H04L 47/781
709/226
2016/0227162 A1* 8/2016 Bargetzi ................ H04L 63/102

FOREIGN PATENT DOCUMENTS

JP 2005-316991 11/2005
JP 2016-536685 11/2016
(Continued)

*Primary Examiner* — Kyung H Shin
(74) *Attorney, Agent, or Firm* — Oblon, McClelland, Maier & Neustadt, L.L.P.

(57) ABSTRACT

A resource reservation system includes an information processing apparatus configured to manage reservation information regarding reservation of a resource, and a first information processing terminal configured to display the reservation information obtained from the information processing apparatus. The first information processing terminal includes first circuitry configured to: obtain resource setting information regarding setting of a second information processing terminal from the information processing apparatus; and implement a function of an in-terminal server that communicates as a server with the second information processing terminal. The second information processing terminal includes browser software that when executed by second circuitry of the second information processing terminal causes the second circuitry to: obtain a setting file generated from the resource setting information from the first information processing terminal, when the second information processing terminal communicates with the in-terminal server; and set the setting file in the second information processing terminal.

16 Claims, 12 Drawing Sheets

(51) Int. Cl.
    *H04L 29/08*     (2006.01)
    *H04L 29/06*     (2006.01)
    *H04L 12/18*     (2006.01)

(56) References Cited

FOREIGN PATENT DOCUMENTS

| | | |
|---|---|---|
| JP | 2019-165343 | 9/2019 |
| WO | WO2015/069565 A1 | 5/2015 |

\* cited by examiner

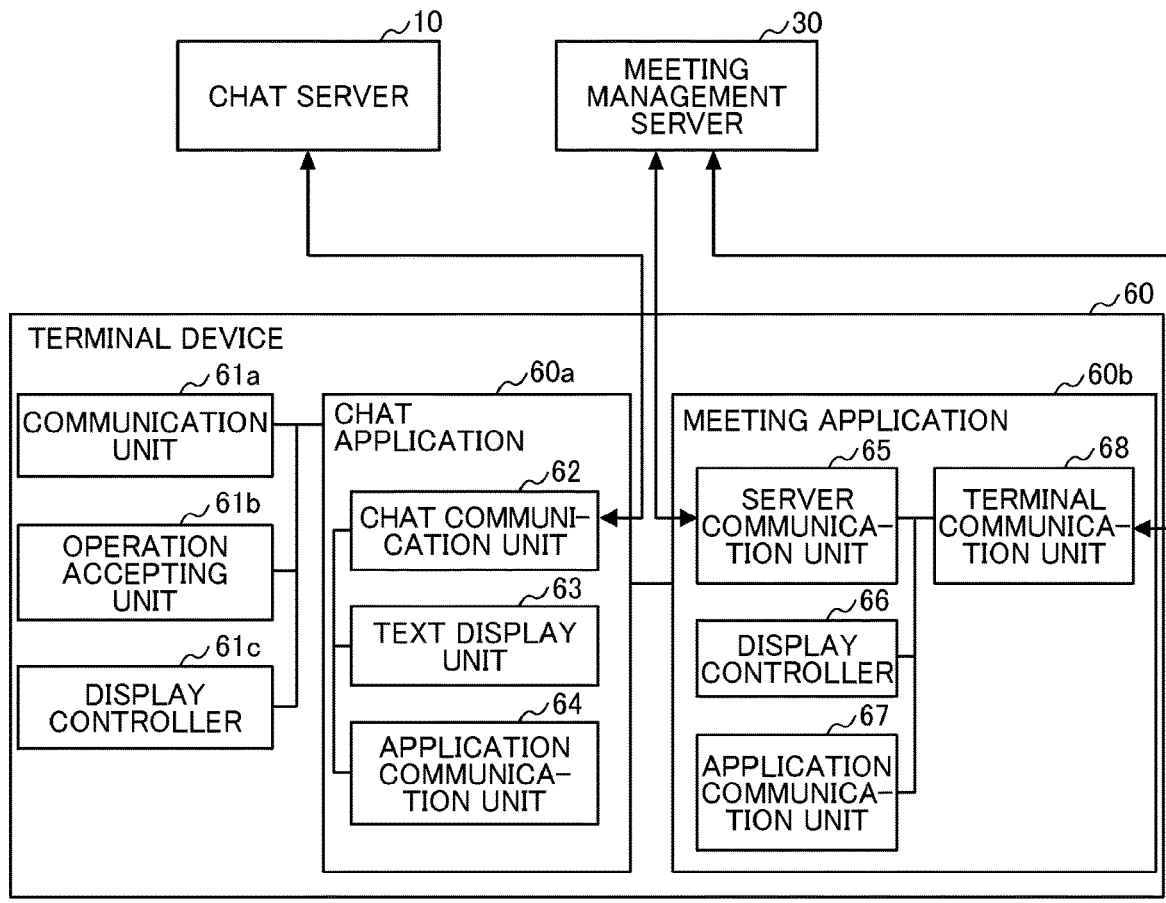

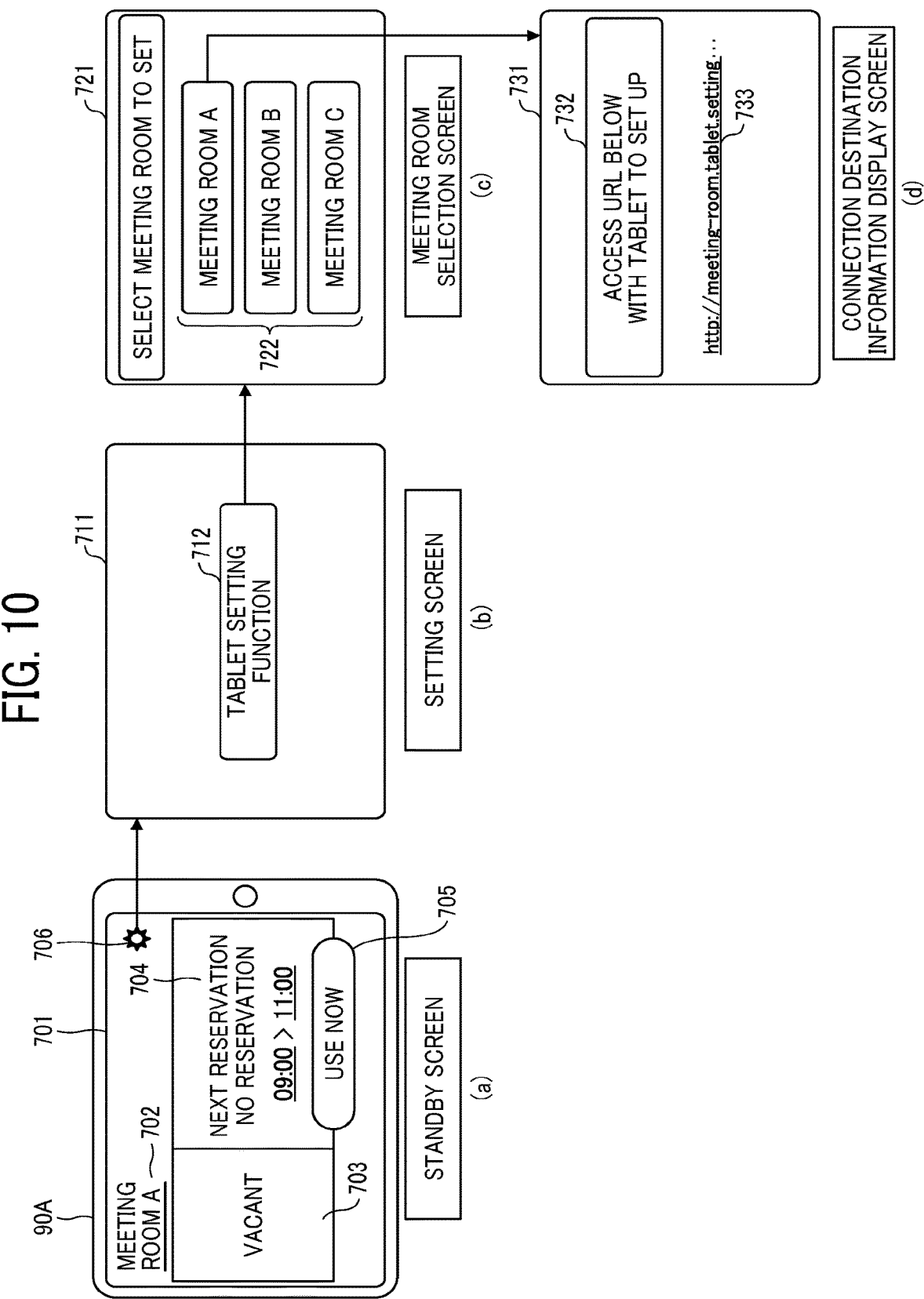

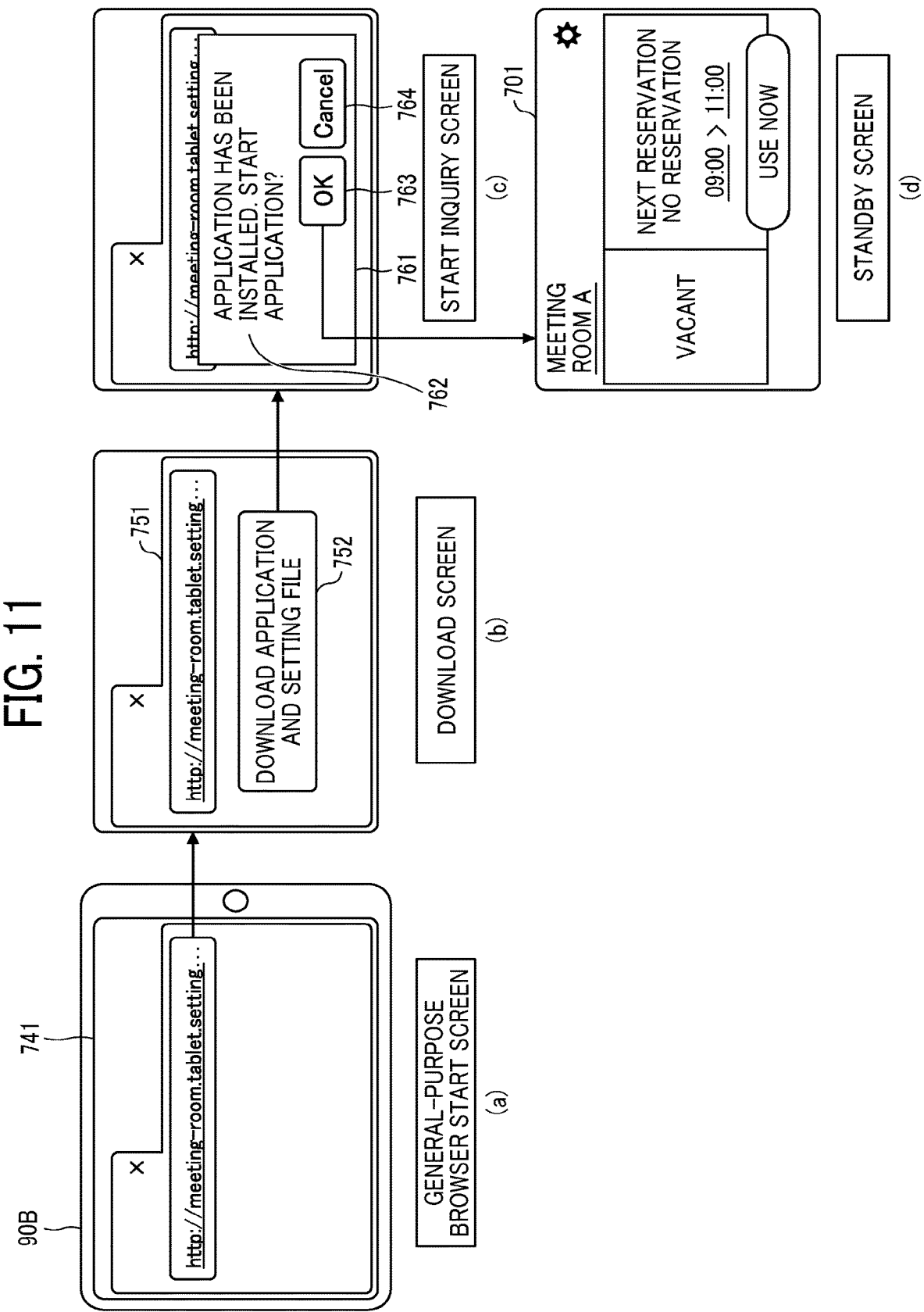

RESOURCE RESERVATION SYSTEM, SETTING METHOD, AND NON-TRANSITORY COMPUTER READABLE STORAGE MEDIUM

CROSS-REFERENCE TO RELATED APPLICATIONS

This patent application is based on and claims priority pursuant to 35 U.S.C. § 119(a) to Japanese Patent Application No. 2019-013645, filed on Jan. 29, 2019, in the Japan Patent Office, the entire disclosure of which is hereby incorporated by reference herein.

BACKGROUND

Technical Field

The present disclosure relates to a resource reservation system, a setting method, and a non-transitory computer readable storage medium.

Description of the Related Art

In a case where a user uses an information processing terminal for the first time, initial setting of the information processing terminal such as network setting is to be configured in many cases. Since functions of the information processing terminal have been advanced, the user has to manually configures settings for a large number of items before use.

SUMMARY

According to one or more embodiments, a resource reservation system includes an information processing apparatus configured to manage reservation information regarding reservation of a resource, and a first information processing terminal configured to display the reservation information obtained from the information processing apparatus. The first information processing terminal includes first circuitry configured to: obtain resource setting information regarding setting of a second information processing terminal from the information processing apparatus; and implement a function of an in-terminal server that communicates as a server with the second information processing terminal. The second information processing terminal includes browser software that when executed by second circuitry of the second information processing terminal causes the second circuitry to: obtain a setting file generated from the resource setting information from the first information processing terminal, when the second information processing terminal communicates with the in-terminal server; and set the setting file in the second information processing terminal.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 7A and FIG. 7B are block diagrams illustrating an example of functional configurations of a terminal device and the meeting-room terminal, according to an embodiment of the present disclosure;

FIG. 10 is a diagram illustrating examples of screens displayed by a first meeting-room terminal, according to an embodiment of the present disclosure; and FIG. 11 is a diagram illustrating examples of screens displayed by the second meeting-room terminal, according to an embodiment of the present disclosure.

Figure 1:
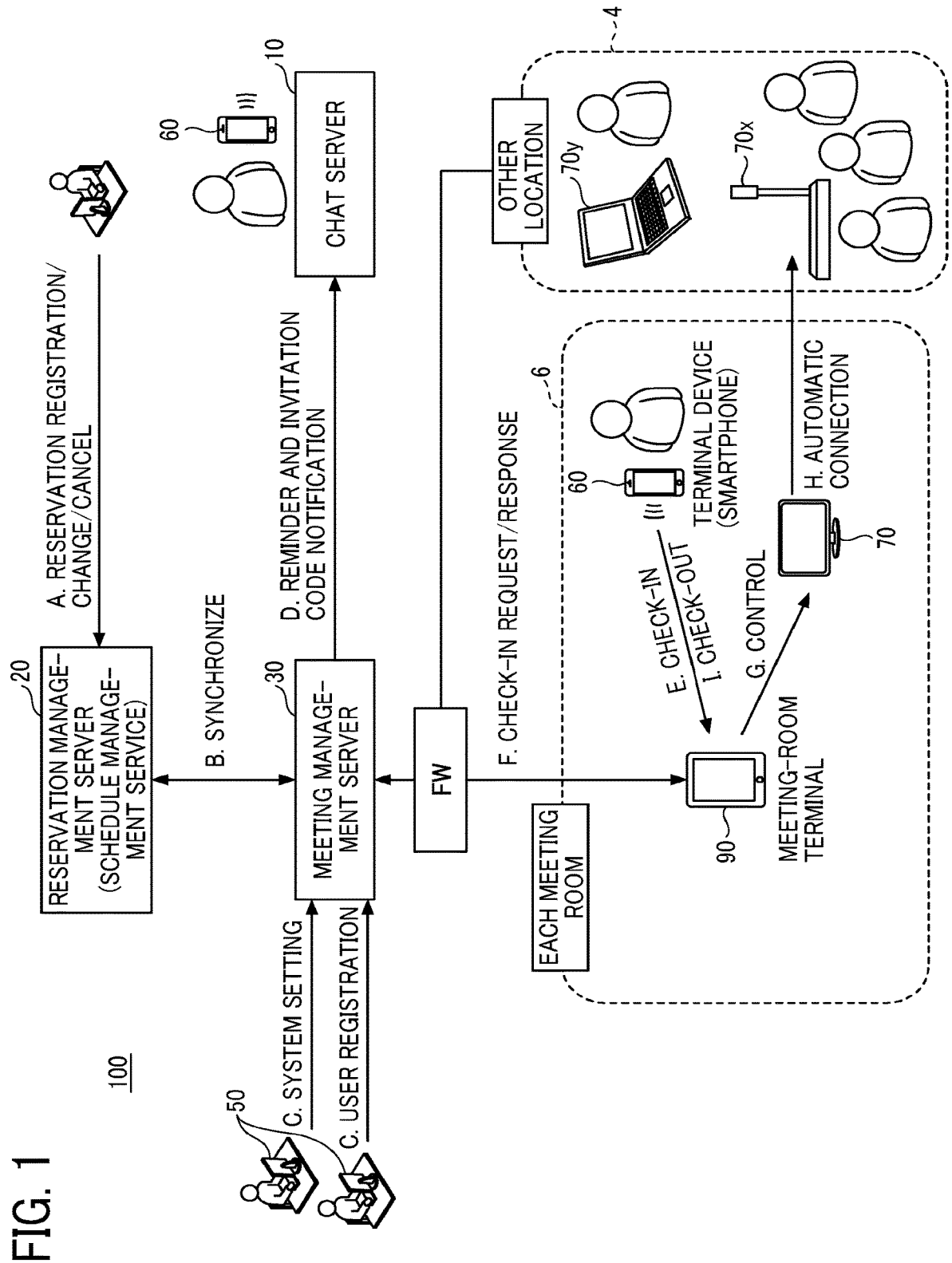
FIG. 1 is a diagram illustrating an example of an overview of operation performed by a resource reservation system, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Now, as examples for implementing the present disclosure, a resource reservation system and a setting method performed by the resource reservation system will be described.

Overview of Resource Reservation System:

First, an outline of the resource reservation system will be described with reference to FIG. 1. FIG. 1 is an example illustrating an outline of the entire operation of a resource reservation system 100.

A. By operating his/her terminal device 60, a reserving person communicates with a reservation management server 20 and reserves a meeting room. The reservation management server 20 is a general-purpose cloud service (e.g., Office 365, G Suite (both are registered trademarks), or the like) in which meeting rooms are registered. The meeting rooms are owned by an organization such as a company to which the reserving person belongs.

B. On the basis of a meeting-room reservation status, a meeting management server 30 controls the entirety of the resource reservation system 100. The meeting management server 30 obtains reservation information by communicating with the reservation management server 20 as appropriate. Thus, the reservation information is synchronized between the reservation management server 20 and the meeting management server 30.

C. An administrator, for example, in the organization that uses the resource reservation system 100 can register users and set various settings in the meeting management server 30 by operating a registration terminal 50. To register a user is to register, in the meeting management server 30, identification (ID), an email address, or the like for identifying the individual user of the resource reservation system 100. For example, a user to whom various notifications are to be sent by using a chat server 10 (e.g., slack, LINE, Microsoft Teams (all of them are registered trademarks), or the like) is registered. In addition, since a notification is sent from a bot that transmits a message as the meeting management server 30, a bot provided by the chat server is also registered. The bot is a program for providing, to a user, an interface of various notifications, acceptance of inputs, and the like as an agent of the resource reservation system 100 or the meeting management server 30 in each chat application (terminal application of a chat system) in a terminal, such as a smartphone, owned by each user. The bot is a program on the chat server 10 and sends notifications, accepts inputs, provides various kinds of guidance, and the like while communicating with a user (user of the resource reservation system 100) as a virtual chat partner. As an example, the bot serves as a contact of the system by sending a reminder of the reservation information to the user from the resource reservation system 100 or by receiving, in a chat, user input for participating or not participating in a meeting as a response to the reminder. The various settings are registration of a meeting-room terminal 90, setting of a reminding time, and the like.

D. At a certain time before a meeting start time according to the reservation information, the meeting management server 30 reminds the reserving person of holding of the meeting, thereby reducing an empty reservation of a meeting room. The "empty reservation" refers to reserving resources such as a meeting room that is not actually used. In addition, the meeting management server 30 notifies the user of an invitation code (invitation to a group) as necessary. By receiving the reminder, the reserving person of the meeting stores information for checking in the meeting room (meeting identification information) in the terminal device 60. To check in is processing in which the user inputs an instruction for check-in to use the meeting room, the meeting management server 30 receives, in response to the instruction for check-in, information indicating check-in and sets a start flag indicating the start of use of a predetermined meeting room.

E. The meeting-room terminal 90 is provided in each meeting room 6 and regularly downloads reservation information of a meeting to be held in the meeting room 6. The meeting-room terminal 90 can display schedules of meetings of the day or upcoming meetings so that participants of the meetings can check the schedules. At a time slightly before the meeting start time, the reserving person of the meeting room 6 comes to the meeting room 6 and checks in. For example, the reserving person inputs the meeting identification information to the meeting-room terminal 90 or puts the terminal device 60 over the meeting-room terminal 90 (e.g., the meeting identification information is read, communication is performed, the user presses a check-in button (use start button) displayed by a terminal application 90*a* of the meeting-room terminal 90).

F. The meeting-room terminal 90 transmits a check-in request to the meeting management server 30, and thus, if authentication succeeds on the basis of the meeting identification information, receives a response indicating successful check-in from the meeting management server 30. Display on the meeting-room terminal 90 indicates "during use" (during meeting). If no use start notification indicating check-in is received by a predetermined time before the meeting start time, the meeting management server 30 cancels reservation of the meeting room 6 (deletes the reservation information if use of the meeting room does not start for a predetermined period of time) and transmits reservation information indicating "cancelled" as a status to the meeting-room terminal 90. In this case, display on the meeting-room terminal 90 indicates "vacant", and thus, a given user can use the meeting room 6.

G. The meeting-room terminal 90 controls an electronic device 70 in response to a request from the meeting management server 30. For example, the meeting-room terminal 90 turns on at the meeting start time and turns off at a meeting end time. This can increase the usability of the electronic device 70 for participants of the meeting.

H. In a case where the electronic device 70 has a function for teleconference, for example, the electronic device 70 can communicate with an electronic device (e.g., a teleconference terminal 70*x*) at another location 4 to hold a meeting with the other location. Note that a PC 70*y* on which an application operates can also communicate with the electronic device 70. The reservation information includes in advance address information (communication ID of a destination) indicating the other location 4, and the electronic device 70 can automatically communicate with the teleconference terminal 70*x* and the PC 70*y*.

I. When the meeting ends, the reserving person presses a button of the meeting-room terminal 90 for check-out, and the meeting-room terminal 90 displays the next reservation status. This enables a given user to understand the reservation status of the meeting room 6.

Overview of Initial Setting:

Hereinafter, the meeting-room terminal 90 in which a setting file is to be set will be referred to as a second meeting-room terminal 90B, and the meeting-room terminal 90 that transmits the setting file to the second meeting-room terminal 90B will be referred to as a first meeting-room terminal 90A. The second meeting-room terminal 90B (example of a second information processing terminal) is the meeting-room terminal 90 to be newly provided in a meeting room, and the first meeting-room terminal 90A (example of a first information processing terminal) is the meeting-room terminal 90 that is already provided in a meeting room.

Figure 2:
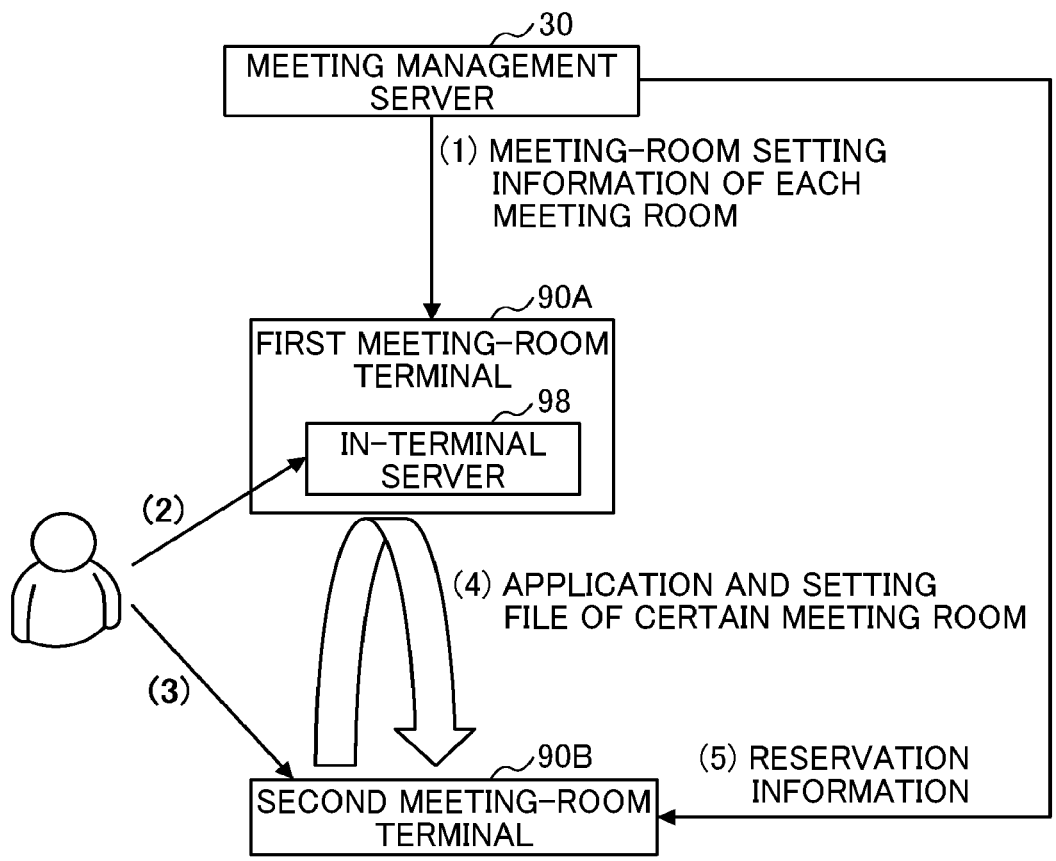
FIG. 2 is a diagram illustrating an example of a working procedure in which an administrator configures, in a second meeting-room terminal, setting of a meeting-room terminal, according to an embodiment of the present disclosure.

FIG. 2 is a diagram illustrating an example of a working procedure in which an administrator configures, in the second meeting-room terminal 90B, setting of the meeting-room terminal 90. By configuring the setting of the meeting-room terminal 90, it is possible to obtain reservation information, and such setting is referred to as initial setting or setup.

(1) The administrator operates the first meeting-room terminal 90A to communicate with the meeting management server 30 and obtains a meeting room list. The meeting room list includes meeting-room setting information of each meeting room. At least part of the meeting-room setting information is included in a setting file.

(2) In response to the administrator selecting a meeting room in which the second meeting-room terminal 90B is to be provided, an in-terminal server 98 included in the first meeting-room terminal 90A starts.

(3) When the administrator performs an operation in the second meeting-room terminal 90B for connecting to the in-terminal server 98, the second meeting-room terminal 90B obtains the setting file of the meeting room selected by the administrator and a terminal application from the in-terminal server 98.

(4) The second meeting-room terminal 90B installs the terminal application therein and sets the setting file of the selected meeting room in the second meeting-room terminal 90B. Thus, the initial setting is completed.

(5) By using the setting file, the second meeting-room terminal 90B can obtain reservation information from the meeting management server 30.

Accordingly, in the resource reservation system according to this embodiment, it is unnecessary to manually configure the initial setting for each item, and the second meeting-room terminal 90B can succeed the setting file from the first meeting-room terminal 90A. In addition, the administrator can set the setting file even in a state where the meeting management server 30 has nothing to do with the second meeting-room terminal 90B and the terminal application is not installed in the second meeting-room terminal 90B.

Terms Used in the Disclosure

The term "resource" refers to a resource such as a meeting room, and equipment, device, person (receptionist), mechanisms, etc. that can be used in the meeting room. Among resources, a resource that is difficult to move is referred to as a "facility". In this embodiment, for the sake of explanatory convenience, the term "meeting room" is used as an example of the resource.

The term "initial setting" refers to that that a person configures any suitable settings so that that a device can implement at least a minimum function. For example, the initial setting includes setting related to communication or the like. Information to be used for communication is information that is set in the initial setting.

In order for the meeting-room terminal 90 to start communicating with the meeting management server 30, the meeting-room terminal 90 is required to store communication setting information in the initial setting set by the administrator. This starts a periodical request of reservation information, but whether to be able to obtain the reservation information depends on the setting of the meeting management server 30.

If a management start flag of the meeting management server 30, which will be described later, is set to True, the meeting management server 30 is ready to manage the meeting room. If the management start flag is True and the request for the reservation information is received from the meeting-room terminal 90, the meeting management server 30 starts managing the meeting room. This starts transmission of the reservation information in response to the request from the meeting-room terminal 90.

Figure 3:
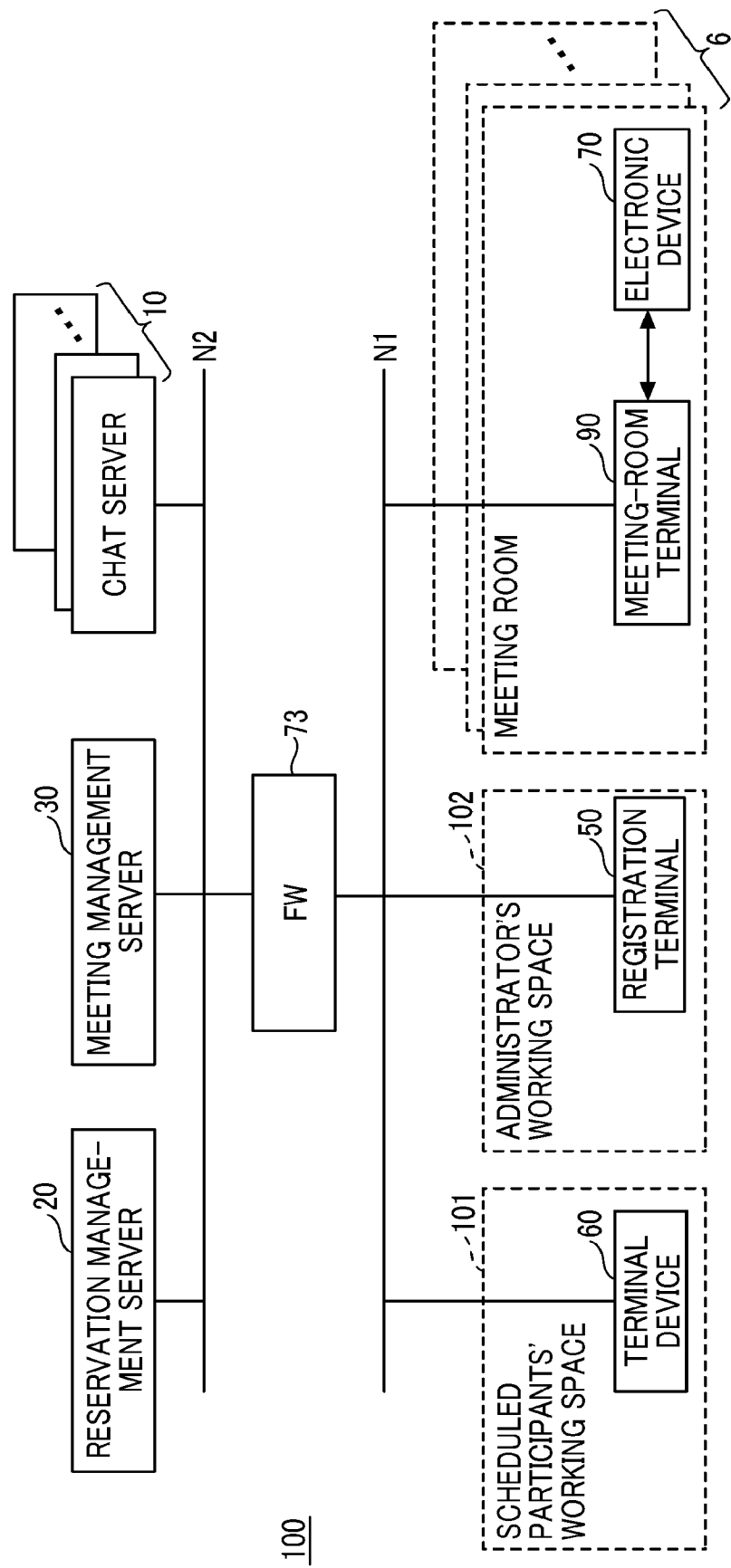
FIG. 3 is a schematic diagram illustrating an example of a system configuration of the resource reservation system, according to an embodiment of the present disclosure.

Example of System Configuration:

FIG. 3 illustrates a system configuration example of the resource reservation system 100. The resource reservation system 100 can be mainly divided into an in-house network N1 and an outside network N2. The in-house network N1 is a network inside a firewall 73, and the outside network N2 is a network such as the Internet via which an unspecified large number of communications are performed.

To the outside network N2, the reservation management server 20, the meeting management server 30, and the at least one chat server 10 are connected, and each of the servers can perform communication as necessary. To the outside network N2, the terminal device 60 operated by a participant of a meeting may be connected as necessary.

The reservation management server 20 is implemented by one or more information processing apparatuses (computer system), each being installed with a general-purpose server operating system (OS) or the like. A system related to reservation of equipment provided by the reservation management server 20 is referred to as a reservation management system. The reservation management server 20 has a calendar system and provides a web application that manages various kinds of schedules. Specifically, for example, the reservation management server 20 has the following functions:

To accept registration of a schedule and allow the reserving person to check the schedule at any time;

To remind the schedule by email at a set date and time, e.g., half an hour before the schedule;

To allow a person to manage a plurality of calendars (for work, for home, and the like); and To allow persons in the same group to share a calendar.

The reservation management server 20 manages users by using accounts. An account is a right for a user to use a service. In many systems, the user logs in to a system by using the account. Thus, the account has a function for the system to uniquely identify the user (function of identification information). In this embodiment, the reservation management server 20 transmits, to the meeting management server 30, reservation information of an account (domain) registered in advance. Alternatively, by designating the account used by the reservation management server 20, the meeting management server 30 requests the reservation information, and the meeting management server 30 can obtain the reservation information of the meeting room 6 from the reservation management server 20. Note that the account may be information by which the user can be uniquely identified, such as an email address, ID, or a telephone number.

Although the reservation of the meeting room 6 is managed as a schedule in this embodiment, the reservation management server 20 can manage various kinds of schedules in addition to the meeting room 6. In addition to the meeting room 6, the reservation management server 20 can be used for reserving various kinds of equipment such as any kind of electronic device, a parking lot, a rental office, a rental studio, a rental cycle, a rental car, an accommodate such as a hotel, a rental space such as a hall for entertainment or a locker.

Note that as the reservation management server 20 or the reservation management system including a reservation management server, G Suite (registered trademark), Office 365 (registered trademark), and the like are known. However, any reservation management system having the functions described in this embodiment may be used.

In addition, in this embodiment, information regarding the meeting room 6 in the in-house network N1 is registered in advance in the reservation management server 20. That is, the web application of the reservation management server 20 is customized in accordance with the meeting-room name, the meeting-room ID, an available time, a capacity, a reservation unit, and the like of each meeting room 6 in the in-house network of a company that uses the resource reservation system 100. Thus, the meeting room 6 of the company that uses the resource reservation system 100 and the reservation information are coupled to each other.

The chat server 10 can be implemented by one or more information processing apparatuses (computer system), each being installed with a general-purpose server OS or the like. A system provided by the chat server 10 for sharing information such as text, sound, or video in real time among a plurality of users is referred to as a chat system. The chat server 10 notifies the terminal device 60 of information regarding reservation of the meeting room 6. In this embodiment, a plurality of chat servers 10 whose operating units are different may be included.

The shared information is not limited to text and may be images, sound, and the like. However, for the convenience of the description, this embodiment will describe text being mainly used for notification. For example, the chat system may provide a function for voice communication within a group. The voice communication may be performed one on one or one on N (≥2). Thus, in this embodiment, in a case where the chat system notifies the terminal device 60 of information regarding reservation of the meeting room 6, the chat system may display text or may output voice messages. Note that although LINE (registered trademark, hereinafter omitted), slack (registered trademark, hereinafter omitted), Microsoft Teams (registered trademark, hereinafter omitted), and the like are known as the chat system, any chat system that can notify one or more users by using a bot (program for executing predetermined processing) may be used.

Although the chat server 10 similarly manages users by using accounts (different from the accounts used by the reservation management server 20), the meeting management server 30 basically does not need to recognize the accounts used by the chat server 10. However, the meeting management server 30 can designate a given account used by the chat server 10 for notification.

The meeting management server 30 (example of an information processing apparatus in appended claims) can be implemented by one or more information processing apparatuses (computer system) in which a general-purpose server OS or the like is installed. As processing regarding the outside network N2, the meeting management server 30 obtains the reservation information of the meeting room 6 from the reservation management server 20, obtains scheduled participants that are set in the reservation information, and notifies a group (or an individual person such as a reserving person) of the chat server 10 associated with the scheduled participants at a set time. In addition, as processing regarding the in-house network N1, the meeting management server 30 manages check-in and check-out of the meeting room 6 and controls a power or the like of the electronic device 70 on the basis of the reservation information of the meeting room 6 obtained from the reservation management server 20.

The in-house network N1 includes the meeting room 6, a scheduled participants' working space 101, an administrator's working space 102, and the like, and the scheduled participants can access the outside network N2 via the in-house network N1 from the respective locations. For example, the in-house network N1 is a local area network (LAN). The meeting room 6, the scheduled participants' working space 101, and the administrator's working space 102 are not necessarily within the LAN of the same company.

In the meeting room 6, the meeting-room terminal 90 and the electronic device 70 are provided. The meeting-room terminal 90 and the electronic device 70 can perform communication via a small-scale LAN or a dedicated line. The electronic device 70 can be connected to the in-house network N1 and the outside network N2 without via the meeting-room terminal 90. The meeting-room terminal 90 and the electronic device 70 may perform communication wirelessly or with a wire. Note that the in-house network N1 is within the firewall 73, and thus, direct communication from the outside network N2 to the in-house network N1 is difficult.

The meeting-room terminal 90 is an information processing terminal operated by a participant of a meeting, such as a reserving person who uses the meeting room 6. The meeting-room terminal 90 and the information processing terminal are identical with each other, serving as the information processing terminal before initial setting, and serving as the meeting-room terminal 90 after initial setting. The name may change depending on the installed location or usage. In the following description, the meeting-room terminal 90 is used as the name for the convenience of the description.

The meeting-room terminal 90 is the information processing terminal operated by a participant of a meeting, such as a reserving person who uses the meeting room 6. The meeting-room terminal 90 may be provided on a desk in the meeting room 6 or at the entrance of the meeting room 6. A plurality of meeting-room terminals 90 may be provided in the meeting room 6. The meeting-room terminal 90 can be implemented by one or more information processing apparatuses (computer system), each being installed with a general-purpose OS or the like.

The meeting-room terminal 90 transmits the meeting-room ID to the meeting management server 30 and displays the reservation information of the meeting room 6 of the day, for example. In addition, the meeting-room terminal 90 regularly requests the reservation information and obtains changed reservation information. Furthermore, the meeting-room terminal 90 obtains control information for turning on or off the electronic device 70, for example, from the meeting management server 30. Thus, the meeting-room terminal 90 turns on or off the electronic device 70.

In addition, the meeting-room terminal 90 displays a standby screen for check-in, check-out, and the like, and communicates with the meeting management server 30 in order to notify the meeting management server 30 of check-in or check-out. At the time of check-in, the meeting-room terminal 90 transmits, to the meeting management server 30, the meeting identification information that is input by the reserving person and the meeting-room ID that is held in advance, and thus, from the meeting identification information and the meeting-room ID, the meeting management server 30 can confirm that the meeting room 6 that is reserved by the reserving person, who has reserved the meeting room 6, is to be used.

The electronic device 70 is any of various kinds of office devices that can be used in the meeting room 6. For example, the electronic device 70 is an electronic whiteboard, a multifunction peripheral, a projector, a digital signage, a digital camera, or the like. The electronic whiteboard includes a large display with a touch panel, detects coordinates on a board designated by a user and connects the coordinates to display a stroke. In addition, the electronic whiteboard can display a video of a connected personal computer (PC) or perform communication with an electronic whiteboard at another location to synchronize strokes. Note that the electronic whiteboard may also be referred to as an electronic information board or an electronic whiteboard.

The multi-function device includes functions of a copier, a scanner, a printer, and a facsimile and is used to print or copy a material used during a meeting, digitize a material, transmit a material, or the like. The projector is an apparatus that projects an image. For example, a video displayed by the terminal device 60 on a display can be projected onto a screen or the like to be shared among participants. The digital signage is a large-scale display and is used to display a given still image or moving image. The digital camera is used by each participant to capture an image of a paper material or a material displayed on the electronic whiteboard and store the image.

In the scheduled participants' working space 101, the terminal device 60 to be connected to the in-house network N1 is provided. The terminal device 60 may perform communication wirelessly or with a wire. The terminal device 60 is an information processing apparatus used when a scheduled participant (including the reserving person) reserves a meeting room and is assumed to be carried into the meeting room. The terminal device 60 is an information processing apparatus carried by a scheduled participant.

The terminal device 60 can be implemented by one or more information processing apparatuses (computer system), each being installed with a general-purpose OS or the like. The terminal device 60 is, for example, a smartphone, a tablet terminal, a PC, a personal digital assistant (PDA), a wearable PC (e.g., sunglasses type or wristwatch type), or the like. Note that the terminal device 60 has a communication function, and browser software or application software dedicated to the chat server 10 or the reservation management server 20 may operate. For example, the terminal device 60 may be a car navigation device, a game console, a television receiver, or the like.

On the terminal device 60, application software dedicated to the chat server 10 (hereinafter referred to as chat application) operates, and further, application software dedicated to the resource reservation system 100 (hereinafter referred to as meeting application) operates. However, these may be substituted by browser software.

In the administrator's working space 102, the registration terminal 50 that can be connected to the in-house network N1 is provided. The registration terminal 50 may perform communication wirelessly or with a wire. The registration terminal 50 is a terminal used by the administrator to set various settings in the meeting management server 30.

Figure 4:
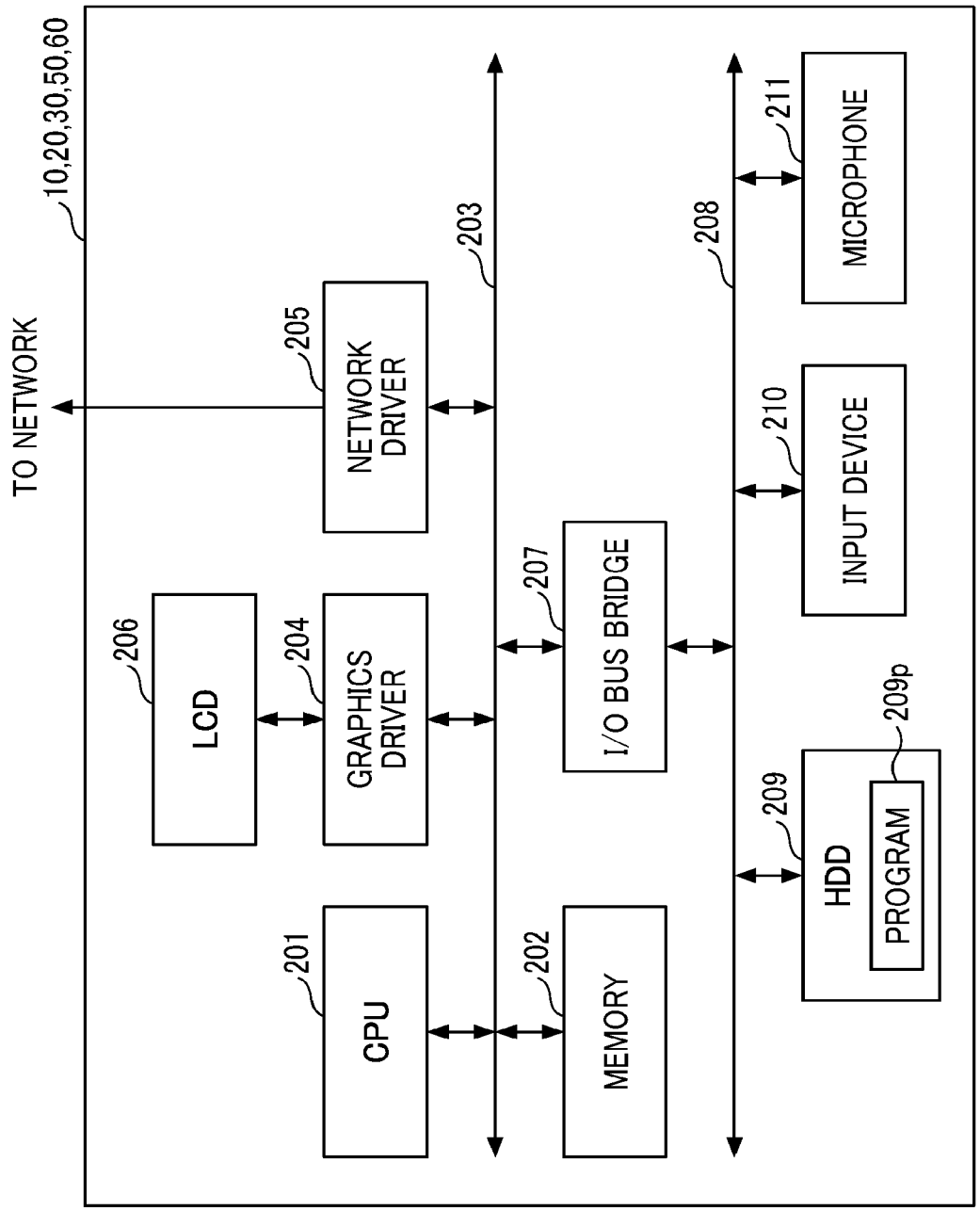
FIG. 4 is a block diagram illustrating an example of a hardware configuration of a meeting management server, according to an embodiment of the present disclosure.

The registration terminal 50 may be an information processing apparatus that is the same as or substantially the same as the terminal device 60. However, mainly, the registration terminal 50 is used by the administrator to set the meeting management server 30, the registration terminal 50 does not necessarily include the chat application or the meeting application. The registration terminal 50 mainly communicates with the meeting management server 30 by browser software to display a web page. The registration terminal 50 functions as display means of the meeting management server 30. Note that the display means that displays a screen provided by the meeting management server 30 may be display means that is directly connected to the meeting management server 30 or display means provided in the server apparatus itself Hardware Configuration:

Hardware Configuration of Meeting Management Server:

FIG. 4 illustrates a hardware configuration example of the meeting management server 30. This is an example of a schematic hardware configuration of the meeting management server 30. The meeting management server 30 includes a central processing unit (CPU) 201 and a memory 202 that enables high-speed access of data used by the CPU 201. The CPU 201 and the memory 202 are connected to other devices or drivers of the meeting management server 30, such as a graphics driver 204 and a network driver (NIC) 205, via a system bus 203.

The graphics driver 204 is connected to a liquid crystal display (LCD, an example of a display) 206 via a bus to monitor processing results of the CPU 201. In addition, the network driver 205 connects the meeting management server 30 to the outside network N2 in the transport layer level or in the physical layer level to establish a session with another device.

On the downstream side of the I/O bus bridge 207, a storage device such as a hard disc drive (HDD) 209 is connected via an I/O bus 208 such as a peripheral component interconnect (PCI), in compliance with the Integrated Drive Electronics (IDE), Advanced Technology Attachment (ATA), AT Attachment Packet Interface (ATAPI) 801, serial ATA, Small Computer System Interface (SCSI), Universal Serial Bus (USB), etc. The HDD 209 stores a program 209p that controls the entirety of the meeting management server 30. The HDD 209 may be a solid state drive (SSD). The program 209p may be distributed by being stored in a storage medium or may be distributed from a server for program distribution.

In addition, to the I/O bus 208, an input device 210 such as a keyboard and a mouse (also referred to as a pointing device) and a microphone 211 is connected via a bus such as a USB. The input device 210 accepts an input and instruction by an operator such as a system administrator.

Note that the illustrated hardware configuration of the meeting management server 30 illustrates hardware components that are preferably included in the meeting management server 30.

The hardware configuration of each of the reservation management server 20, the chat server 10, the registration terminal 50, and the terminal device 60 is the same or substantially the same as that of the meeting management server 30. Even if the hardware configuration of each of the reservation management server 20, the chat server 10, the registration terminal 50, and the terminal device 60 is different from that of the meeting management server 30, no problem arises in the description of the resource reservation system 100 according to this embodiment. In addition, in order to support cloud computing, the hardware configuration of the meeting management server 30, the reservation management server 20, and the chat server 10 may be made by dynamically connecting/cutting a hardware resource in accordance with a load. The "cloud computing" refers to internet-based computing where resources on a network are used or accessed without identifying specific hardware resources.

Figure 5:
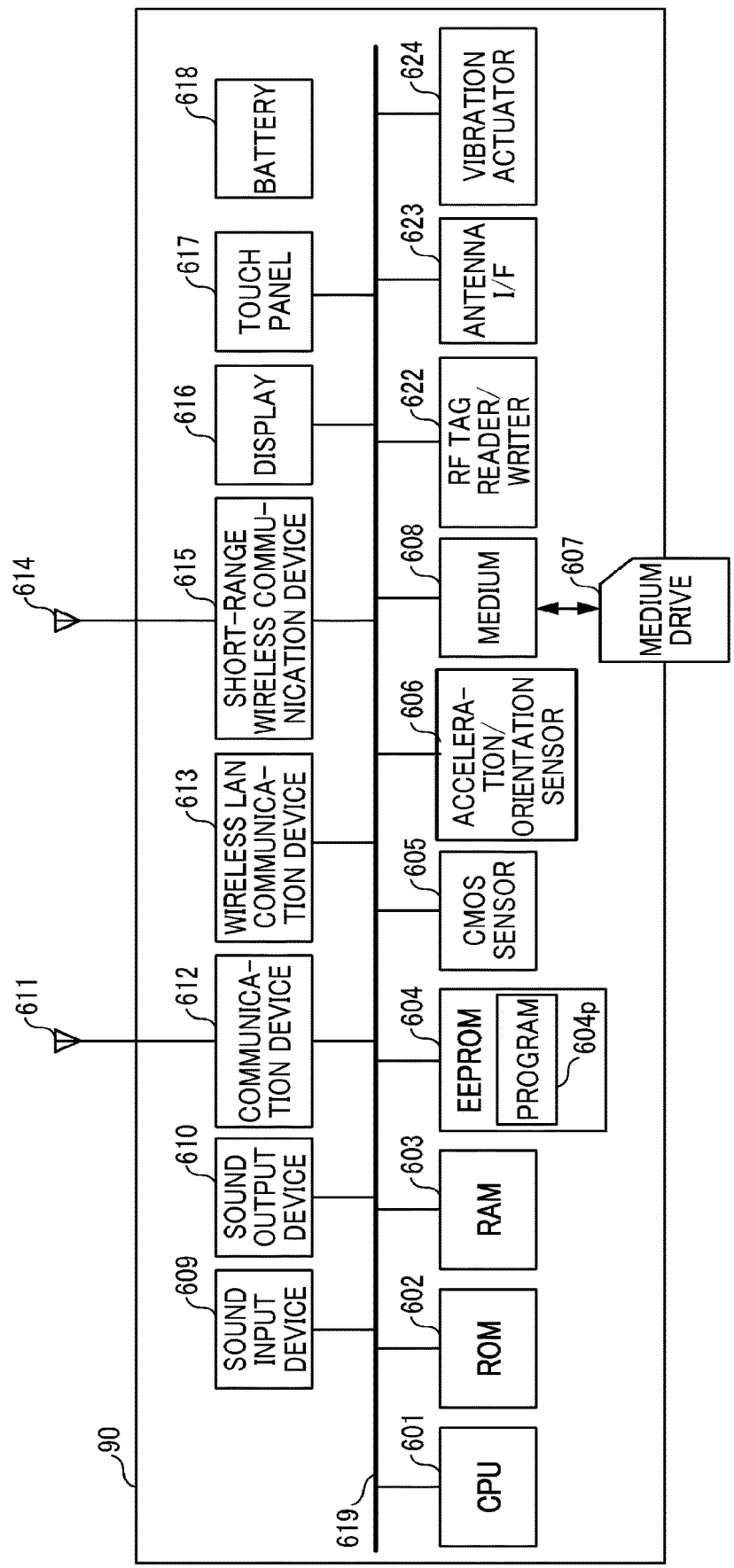
FIG. 5 is a block diagram illustrating an example of a hardware configuration of the meeting-room terminal, according to an embodiment of the present disclosure.

Meeting-Room Terminal:

FIG. 5 illustrates a hardware configuration example of the meeting-room terminal 90. Note that the meeting-room terminal 90 in FIG. 5 is assumed to be a tablet apparatus. The meeting-room terminal 90 includes a CPU 601, a read-only memory (ROM) 602, a random access memory (RAM) 603, an electrically erasable programmable read-only memory (EEPROM) 604, a complementary metal-oxide-semiconductor (CMOS) sensor 605, an acceleration/orientation sensor 606, and a medium drive 608.

The CPU 601 controls the entire operation of the meeting-room terminal 90. The ROM 602 stores a basic input/output program. The RAM 603 is used as a work area of the CPU 601. The EEPROM 604 reads or writes data under control of the CPU 601. The CMOS sensor 605 images a subject under control of the CPU 601 and obtains image data. The acceleration/orientation sensor 606 is an electro-magnetic compass, which detects a geomagnetism, a gyrocompass, an acceleration sensor, or the like.

The medium drive 608 controls reading or writing (storing) of data from or to a medium 607 such as a flash memory. The medium drive 608 is configured such that the medium 607 can be detachably attached. Data that is already recorded is read from the medium 607, or data is newly written and stored in the medium 607.

Note that the EEPROM 604 stores a program 604p to be executed by the CPU 601. The program 604p is application software, an OS, or the like for performing various kinds of processing in the embodiment. The program 604p may be distributed by being stored in the medium 607 or the like or may be distributed from a server for program distribution.

In addition, the CMOS sensor 605 is a charge coupled device, which converts light into charge to digitize a subject's image. As long as a subject can be imaged, the CMOS sensor 605 may be a charge coupled device (CCD) sensor, for example. The CMOS sensor 605 can read a barcode or a two-dimensional barcode.

The meeting-room terminal 90 further includes a radio-frequency (RF) tag reader/writer 622, an antenna interface (I/F) 623, and a vibration actuator 624. The RF tag reader/writer 622 performs communication in compliance with a standard such as Near-Field Communication (NFC).

The vibration actuator 624 is a motor that vibrates the meeting-room terminal 90. For example, near a meeting end time, the meeting-room terminal 90 vibrates so as to inform participants of that.

The meeting-room terminal 90 further includes a sound input device 609, a sound output device 610, an antenna 611, a communication device 612, a wireless LAN communication device 613, a short-range wireless communication antenna 614, a short-range wireless communication device 615, a display 616, a touch panel 617, and a bus line 619.

The sound input device 609 converts sound into a sound signal. The sound output device 610 converts a sound signal into sound. The communication device 612 communicates with the nearest base station apparatus by a wireless communication signal via the antenna 611. The wireless LAN communication device 613 performs wireless LAN communication in compliance with the IEEE 802.11 standard.

The short-range wireless communication device 615 is a communication device in compliance with, for example, Bluetooth (registered trademark) or Bluetooth Low Energy (registered trademark) via the short-range wireless communication antenna 614.

The display 616 is an LCD, an organic electroluminescent (EL) display, or the like that displays a subject's image, various icons, and the like. The touch panel 617 is placed on the display 616 and constituted by a pressure-sensitive or capacitive panel. The display 616 detects a touch position touched by a finger, a stylus, or the like on the display 616. The bus line 619 is an address bus, a data bus, or the like for electrically connecting the above devices to each other.

The meeting-room terminal 90 further includes a dedicated battery 618 and may be driven by either the battery 618 or a commercial power supply. Note that the sound input device 609 includes a microphone to which sound is input. The sound output device 610 includes a speaker from which sound is output.

Functions

Figure 6:
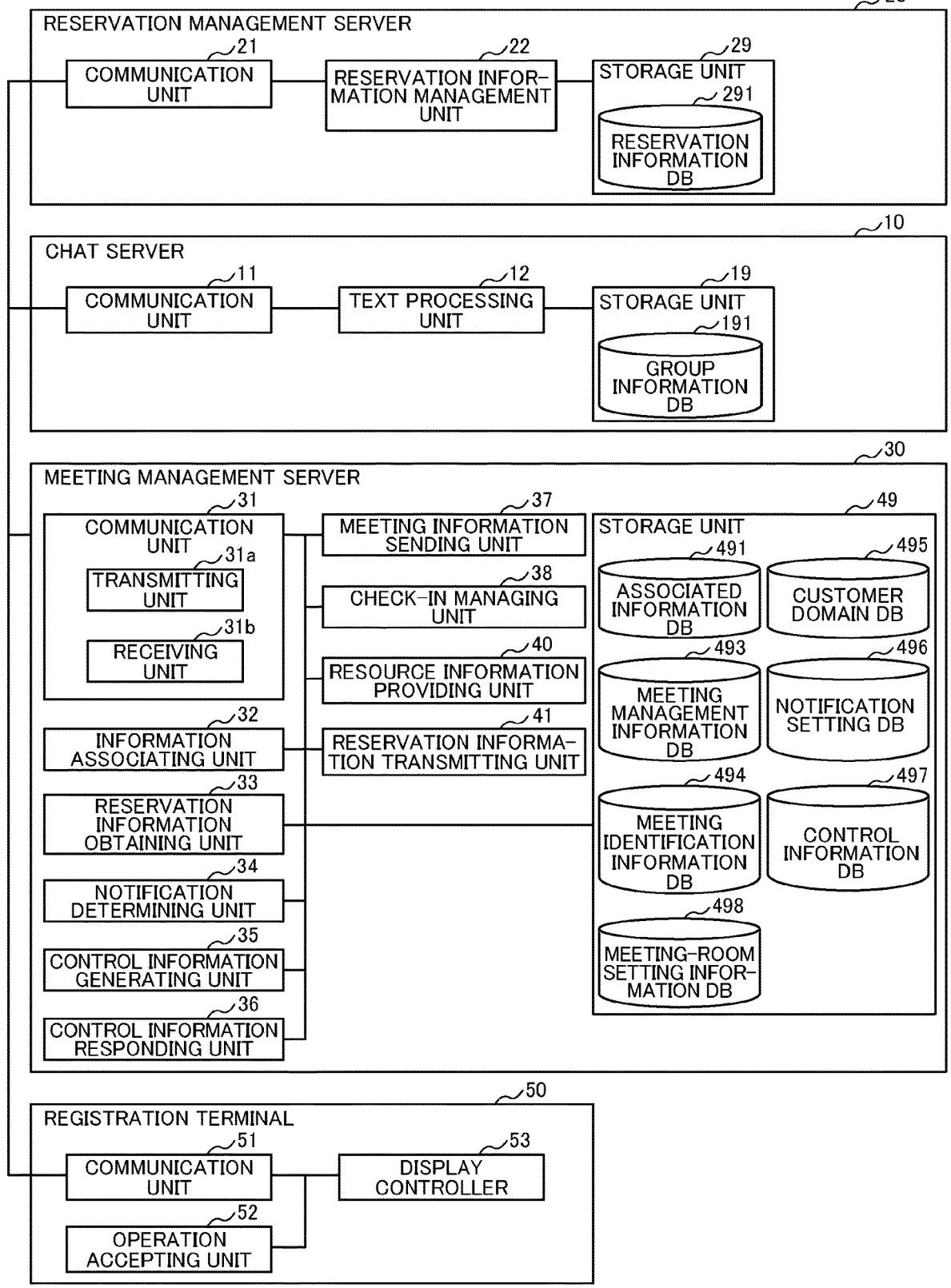
FIG. 6 is a block diagram illustrating an example of functional configurations of a reservation management server, a chat server, the meeting management server, and a registration terminal, according to an embodiment of the present disclosure.

FIG. 6 is a block diagram illustrating an example of functional configurations the reservation management server 20, the chat server 10, the meeting management server 30, and the registration terminal 50.

Reservation Management Server:

The reservation management server 20 includes a communication unit 21 and a reservation information management unit 22. Each of these functional units included in the reservation management server 20 is a function or means implemented by any of the components illustrated in FIG. 4 being operated in accordance with a command from the CPU 201 executing the program 209p that is loaded from the HDD 209 to the memory 202.

The communication unit 21 transmits/receives various kinds of information to/from the meeting management server 30 and the terminal device 60. The communication unit 21 transmits screen information of a reservation setting screen to the terminal device 60 and receives reservation setting from the terminal device 60. In addition, the communication unit 21 transmits reservation information to the meeting management server 30.

The reservation information management unit 22 is a general-purpose web server (web application) that receives reservation information and further manages reservation information registered by a user. Upon registration (or change) of reservation information, the reservation information management unit 22 notifies the meeting management server 30 of an account of a reserving person, and in accordance with a request designating the account from the meeting management server 30, transmits the reservation information to the meeting management server 30 through the communication unit 21. Even if there is no request, the reservation information management unit 22 may transmit changed reservation information to the meeting management server 30. As a method for the reserving person to reserve the meeting room 6 in the reservation management server 20, a general-purpose web application is used.

The reservation management server 20 includes a storage unit 29. The storage unit 29 is implemented by the memory 202, the HDD 209, and the like in FIG. 4. The storage unit 29 stores a reservation information database (DB) 291.

TABLE 1

Reservation Information DB:

| Reservation ID | Reserving Person's Account | Meeting Name | Meeting-Room ID | Start Time | End Time | Scheduled Participants' Accounts |
|---|---|---|---|---|---|---|
| 001 | a@xfood.com | Product Z Development Meeting | K-001 | 2017 Jul. 7 10:00 | 2017 Jul. 7 12:00 | b@xfood.com c@xfood.com d@xfood.com |

TABLE 1-continued

Reservation Information DB:

| Reservation ID | Reserving Person's Account | Meeting Name | Meeting-Room ID | Start Time | End Time | Scheduled Participants' Accounts |
|---|---|---|---|---|---|---|
| 002 | e@xfood.com | Product Y Development Meeting | K-001 | 2017 Jul. 7 13:00 | 2017 Jul. 7 14:00 | f@xfood.com g@xfood.com |
| ... | ... | ... | ... | ... | ... | ... |

Table 1 illustrates an example of the reservation information stored in the reservation information DB 291. The reservation information is information for managing a reservation status of the meeting room 6. In the reservation information, items that are a reserving person's account, a meeting name, a meeting-room ID, a start time, an end time, and scheduled participants' accounts are registered in association with a reservation ID. The reservation ID is identification information for identifying a single record of the reservation information. The "ID" is an abbreviation of identification and means an identifier or identification information. ID is any one of a name, a symbol, a character string, a numerical value, or a combination of at least two of these items, which is used for identifying a specific object from among a plurality of objects. The same applies to IDs other than the reservation ID. The reserving person's account is an account of a scheduled participant who has reserved the meeting room 6. The meeting name is a name of a meeting that the scheduled participant has given as appropriate. The meeting-room ID is identification information for identifying the meeting room 6 within the in-house network. The start time is the start of a period of time for which the meeting room 6 is reserved (time when the meeting starts), and the end time is the end of the period of time for which the meeting room 6 is reserved (time when the meeting ends). The scheduled participants' accounts are accounts of scheduled participants who are scheduled to participate in the meeting. Note that each of the accounts in Table 1 is published by the reservation management server 20.

Chat Server:

The chat server 10 includes a communication unit 11 and a text processing unit 12. Each of these functional units included in the chat server 10 is a function or means implemented by any of the component categories illustrated in FIG. 4 being operated in accordance with a command from the CPU 201 executing the program 209p that is loaded from the HDD 209 to the memory 202.

The communication unit 11 transmits/receives various kinds of information to/from the meeting management server 30. In this embodiment, from the meeting management server 30, the communication unit 11 receives the information regarding reservation of the meeting room 6, bot identification information (e.g., token), and group identification information for identifying a group to which a notification is to be sent. The bot identification information is sent in advance from the chat server 10 as identification information of a bot when the bot of the meeting management server 30 is created. Furthermore, an account of an individual such as the reserving person may be designated in some cases. In addition, the communication unit 11 transmits, to the meeting management server 30, that scheduled participants have read the information regarding reservation of the meeting room 6 or responses from the scheduled participants to the displayed information regarding reservation of the meeting room 6.

On the basis of the bot identification information and the group identification information sent from the meeting management server 30, the text processing unit 12 transmits the information regarding reservation of the meeting room 6 to scheduled participants who belong to the group as information of a message of the bot. This information may be transmitted to all the scheduled participants or to the reserving person or a user to which a notification is sent.

The text processing unit 12 can transmit a so-called push notification. A known mechanism provided by each OS is used for the push notification.

The chat server 10 further includes a storage unit 19. The storage unit 19 is implemented by the memory 202, the HDD 209, and the like in FIG. 4. The storage unit 19 stores a group information DB 191.

TABLE 2

Group Information DB:

| Work Space | Channel | Member Account 1 | Member Account 2 | Member Account 3 | Member Account 4 | Bot Account |
|---|---|---|---|---|---|---|
| http://sample.com/1 | #marketing | a@chat.com | b@chat.com | c@chat.com | d@chat.com | robo@chat.com |
| http://sample.com/2 | #team1 | b@chat.com | d@chat.com | | | |
| http://sample.com/3 | #ip | f@chat.com | g@chat.com | h@chat.com | | robo@chat.com |
| ... | ... | ... | ... | ... | ... | ... |

Table 2 illustrates examples of group information stored in the group information DB 191. In the group information, accounts of members who belong to the same group are registered. In the group information, member accounts 1 to n (n=4 in Table 2) and a bot account are registered in association with a work space and a channel.

The work space is identification information for identifying an organization such as a company or an office. In this embodiment, plural members belong to a workspace (e.g., Company A). Examples of the workspace include a uniform resource locator (URL). Alternatively, any suitable information other than the URL is used as the workspace, provided that the information is unique. Furthermore, the work space has a plurality of channels in accordance with a purpose of a chat or the like. A channel is a group of members among whom information to be shared is exchanged, such as a group for Product A and a group for Product B. Any of the members who belong to the work space belongs to the channel. That is, the notification destination is identified on the basis of the work space and the channel. However, the method for identifying the notification destination differs depending on the chat system. Thus, if there is identification information by which a group is uniquely identified, the information may be used alone. Alternatively, three or more pieces of information may be used for identification.

The uniqueness of each channel is guaranteed. The member accounts 1 to n are accounts of members in the channel and published by the chat server 10. In this embodiment, as a member to which the information regarding reservation of the meeting room 6 is sent, a bot is registered. The bot is, in other words, an agent of the meeting management server 30 or an imaginary member. A message (text) of the bot is transmitted to terminal devices 60 of the member accounts 1 to n.

The work space and the channel are managed by the meeting management server 30 and are information for identifying the group to which participants belong.

Meeting Management Server:

The meeting management server 30 includes a communication unit 31, an information associating unit 32, a reservation information obtaining unit 33, a notification determining unit 34, a control information generating unit 35, a control information responding unit 36, a meeting information sending unit 37, a check-in managing unit 38, a resource information providing unit 40, and a reservation information transmitting unit 41. Each of these functional units included in the meeting management server 30 is a function or means implemented by any of the component categories illustrated in FIG. 4 being operated in accordance with a command from the CPU 201 executing the program 209p that is loaded from the HDD 209 to the memory 202. The program 209p may be distributed by being stored in a storage medium or may be distributed from a server for program distribution.

The communication unit 31 transmits/receives various kinds of information to/from the reservation management server 20, the chat server 10, the registration terminal 50, and the terminal device 60. The communication unit 31 includes a transmitting unit 31a and a receiving unit 31b. The receiving unit 31b receives the reservation information from the reservation management server 20 and receives a request for the reservation information from the meeting-room terminal 90. In addition, the receiving unit 31b receives a check-in request from the meeting-room terminal 90. The receiving unit 31b also accepts association of a group and accounts used by the chat system from the registration terminal 50 operated by the administrator. The transmitting unit 31a transmits the information regarding reservation of the meeting room 6 to the chat server 10 and transmits the reservation information to the meeting-room terminal 90.

The information associating unit 32 mainly performs processing regarding registration in advance. That is, the information associating unit 32 accepts registration of a domain from the registration terminal 50 operated by the administrator or the like, registers the domain in a customer domain DB 495, and registers the work space and channel in the chat system and accounts used by the reservation management server 20, transmitted from the registration terminal 50 or the like, in association with each other in an associated information DB 491.

The reservation information obtaining unit 33 designates an account of a customer that uses the resource reservation system 100, obtains the reservation information from the reservation management server 20, and registers the reservation information in a meeting management information DB 493 as meeting management information. The reservation information obtaining unit 33 may designate an account in the registered or updated reservation information that has been sent from the reservation management server 20 or may designate a given account. At least part of the reservation information from the reservation management server 20 is stored in the meeting management information DB 493. The reservation information obtaining unit 33 obtains, from the reservation information held by the reservation management server 20, reservation information for a predetermined period from the present to the future. The predetermined period is determined depending on the period over which the information regarding reservation of the meeting room 6 in which meetings will be held is sent.

The notification determining unit 34 determines whether there is any reservation of which the start time satisfies a notification condition in the meeting management information. For example, referring to a notification setting DB 496, the notification determining unit 34 determines to send a notification at the time of a set date and time by counting backwards from the reserved start time. Alternatively, upon the reservation information obtaining unit 33 obtaining the reservation information from the reservation management server 20, the notification determining unit 34 may generate a task for sending information regarding reservation and register the task in a queue. The task stored in a queue is executed at the execution time (time for reminder). Note that in a case where bots have the respective different roles, such as a bot for reminder and a bot for accepting reservation, the bot is specified in accordance with processing.

Referring to the meeting management information, the control information generating unit 35 generates control information of the electronic device 70 and registers the control information in a control information DB 497. For example, at a few minutes before the meeting start time, the control information generating unit 35 generates control information for turning on the electronic device 70, and upon detecting check-out, the control information generating unit 35 generates control information for turning off the electronic device 70. The control information is stored in the control information DB 497.

The control information responding unit 36 accepts an inquiry from the meeting-room terminal 90 in the meeting room 6 as to whether there is control information. Referring to the control information DB 497, the control information responding unit 36 transmits control information corresponding to the meeting room 6 to the meeting-room terminal 90.

If the notification determining unit 34 determines to send a notification, the 38 37 designates the bot identification information (e.g., token for slack) and the group identification information and requests the chat server 10 to send the information regarding reservation of the meeting room 6. Note that the notification is sent a couple of times, and meeting identification information is included in at least one notification. The meeting identification information is information used by the meeting management server 30 to confirm that participants have a right to use during the period of reservation of the meeting room 6. The meeting information sending unit 37 generates the meeting identification information at least before a final notification. Note that the meeting identification information is registered in a meeting identification information DB 494.

The check-in managing unit 38 manages check-in and check-out of a meeting room. In addition, the check-in managing unit 38 mainly registers a status of a meeting in response to check-in and check-out in the meeting management information DB 493. Check-in becomes available five or ten minutes before the start time of a meeting specified based on the reservation ID. Then, in a case where a pair of a meeting-room ID and the meeting identification information transmitted from the meeting-room terminal 90 is registered in the meeting identification information DB 494, check-in is permitted.

The resource information providing unit 40 provides, to the first meeting-room terminal 90A, meeting-room setting information (example of resource setting information) stored in a meeting-room setting information DB 498. The resource information providing unit 40 at least provides information to be used for initial setting from the meeting-room setting information DB 498.

In response to a request from the meeting-room terminal 90, the reservation information transmitting unit 41 transmits the reservation information (the meeting management information) stored in the meeting management information DB 493. The reservation information transmitting unit 41 may transmit the reservation information in the J SON format, XML format, Comma-Separated Values (CSV) format, or the like. Since the reservation information is repeatedly transmitted, a format with low capacitance is advantageous.

The meeting management server 30 further includes a storage unit 49. The storage unit 49 is implemented by the memory 202, the HDD 209, and the like in FIG. 4. The storage unit 49 stores the associated information DB 491, the meeting management information DB 493, the meeting identification information DB 494, the customer domain DB 495, the notification setting DB 496, the control information DB 497, and the meeting-room setting information DB 498.

Table 3 illustrates example of associated information stored in the associated information DB 491. In the associated information, an account of a reservation management system and a group in a chat system are associated with each other. The associated information has items that are a wok space, a channel, and the member accounts 1 to n (n=4 in Table 3). The work space and the channel are as above. As the member accounts 1 to n, accounts of participants published by the reservation management server 20 are registered. In addition, as illustrated in Table 3, accounts in a chat system may be registered. In order to notify a group, information for identifying an account of a user in the reservation management server 20, the user being a user who has reserved a meeting in the reservation management server 20, a group as a notification destination, and a channel (work space and channel name in this embodiment) may be used, and accounts of all members who belong to the group are not necessarily registered. However, in a case where a notification is to be sent to an individual user, since account information in each chat system is required, the account information may be registered as in Table 3.

TABLE 4

| | | | Meeting Management Information DB: | | | | |
|---|---|---|---|---|---|---|---|
| Reservation ID | Reserving Person's Account | Meeting Name | Meeting-Room ID | Start Time | End Time | Scheduled Participants' Accounts | Status |
| 001 | a@xfood.com | Product Z Development Meeting | K-001 | 2017 Jul. 7 10:00 | 2017 Jul. 7 12:00 | b@xfood.com c@xfood.com d@xfood.com | Checked In |
| 002 | e@xfood.com | Product Y Development Meeting | K-001 | 2017 Jul. 7 13:00 | 2017 Jul. 7 14:00 | f@xfood.com g@xfood.com | Notification Sent |
| ... | ... | ... | ... | ... | ... | ... | ... |

Table 4 illustrates an example of the meeting management information stored in the meeting management information DB 493 of the meeting management server 30. Since the reservation information is stored in the meeting management information DB 493, differences from the reservation information DB 291 in Table 1 will be described in Table 4. The meeting management information in Table 4 has items that are a written name of the reserving person, a name of belonging of the reserving person, written names of participants, names of belonging of the participants, and a status. The written name of the reserving person is a name of the reserving person or the like. The name of belonging of the reserving person is a name of an office to which the reserving person belongs. The written names of participants are names of participants or the like. The names of belonging of participants are names of offices to which participants belong. The meeting management server 30 holds or can use user information in which the account, the written name, the

TABLE 3

| | | Associated Information DB: | | | |
|---|---|---|---|---|---|
| Work Space | Channel | Member Account 1 | Member Account 2 | Member Account 3 | Member Account 4 |
| http://sample.com/1 | #marketing | a@xfood.com a@chat.com | b@xfood.com b@chat.com | c@xfood.com c@chat.com | d@xfood.com d@chat.com |
| http://sample.com/2 | #team1 | f@xfood.com f@chat.com | g@xfood.com g@chat.com | h@xfood.com h@chat.com | |
| ... | ... | ... | ... | ... | ... | name of belonging, and the like are associated. Thus, if the account is known, the other information turns out. Note that upon transmission from the reservation management server 20, the written name of the reserving person, the name of belonging of the reserving person, the written names of participants, and the names of belonging of participants may be included.

The status means a status of reservation. For example, statuses that are "notification sent" (the information regarding reservation of the meeting room 6 has been sent), "use confirmed", "checked in", "checked out", "cancelled", and the like are registered.

TABLE 5

Meeting Identification Information DB:

| Reservation ID | Meeting-Room ID | Meeting Identification Information |
|---|---|---|
| 001 | K-001 | 1234 |
| 002 | K-002 | 5678 |
| . . . | . . . | . . . |

Table 5 illustrates an example of meeting identification information management information stored in the meeting identification information DB 494. In the meeting identification information management information, the meeting identification information is managed for each reservation of the meeting room 6. The meeting identification information management information has items that are a reservation ID, a meeting-room ID, and the meeting identification information. These items are the same as those in the reservation information (the reservation information received from the reservation management server 20) except for the status and are described above. Therefore, description will be omitted. Note that the reservation ID is registered so as to identify reservation of the same meeting room 6.

TABLE 6

Customer Domain DB:

| Customer's Domain Name | Customer Administrator's Account |
|---|---|
| xfood.com | a@xfood.com |
| ycar.com | f@ycar.com |
| . . . | . . . |

Table 6 illustrates an example of customer domain information stored in the customer domain DB 495. In the customer domain information, a customer's domain and a customer administrator's account are managed. In the customer domain information, a customer's domain name and a customer administrator's account are registered in association with each other. The customer's domain in Table 6 is a domain of an account (email address) published by the reservation management server 20. In addition, the administrator's account is an account of an administrator (representative) of the customer. The reservation management server 20 issues the accounts in Table 6.

TABLE 7

Notification Setting DB:

| Customer's Domain Name | Notification Setting |
|---|---|
| xfood.com | one day before |
| ycar.com | 12 hours before |
| . . . | . . . |

Table 7 illustrates an example of notification setting information stored in the notification setting DB 496. The notification setting information holds setting regarding a notification for each customer. In the notification setting information, the customer's domain name and the notification setting are registered in association with each other. The notification setting indicates a timing at which the information about the reservation of the meeting room 6 is to be notified. In this example, the timing defines how long ahead the start time of the meeting the notification of the information about the reservation of the meeting room is to be sent. In another example, a fixed date and time can be set in the notification setting. Further, the number of the timings set in the notification setting is not necessarily one. In another example, a plurality of notification settings can be set in association with one customer.

TABLE 8

Control Information DB:

| Meeting-Room ID | Control Content |
|---|---|
| K-001 | Turn ON |
| K-002 | Turn OFF |
| . . . | . . . |

Table 8 illustrates an example of control information stored in the control information DB 497. The control information is information for controlling the electronic device 70 in the meeting room 6. The control information has items that are a meeting-room ID and a control content. The control content is a specific method for controlling the electronic device 70. The meeting management server 30 can set a detailed control content for each electronic device 70. The time for control is not registered because it is difficult to transmit the control content from the meeting management server 30 in the outside network to the meeting-room terminal 90. When the meeting-room terminal 90 accesses the meeting management server 30, if the control information has been generated, the control content is transmitted.

TABLE 9

Meeting-Room Setting Information DB:

| Customer ID | Meeting-Room Name | Meeting-Room ID | State of Meeting-Room Terminal | Authentication Key | Management Start Flag | Number of Meeting-Room Terminals That Can Be Registered |
|---|---|---|---|---|---|---|
| G-001 | Meeting Room A | K-001 | Connected | ***** | True | 1 |

TABLE 9-continued

Meeting-Room Setting Information DB:

| Customer ID | Meeting-Room Name | Meeting-Room ID | State of Meeting-Room Terminal | Authentication Key | Management Start Flag | Number of Meeting-Room Terminals That Can Be Registered |
|---|---|---|---|---|---|---|
| | Meeting Room B | K-002 | Before Setup | ***** | False | 1 |
| | Meeting Room C | K-003 | Disconnected | ***** | True | 2 |

Table 9 illustrates an example of meeting-room setting information stored in the meeting-room setting information DB 498. The meeting-room setting information is information regarding setting of each meeting room. The meeting-room setting information has items that are a meeting-room name, a meeting-room ID, a state of meeting-room terminal, an authentication key, and a management start flag in association with a customer ID. The meeting-room name is a general-purpose name of a meeting room recognized by participants of the meeting and is, for example, a name presented at the entrance of the meeting room. The meeting-room ID is identification for uniquely identifying the meeting room as described above. For simplicity, the meeting-room ID may be the same as that in the reservation management server 20. By providing a conversion table, the administrator can set a meeting-room ID different from that in the reservation management server 20. The state of the meeting room terminal indicates whether initial setting of the meeting-room terminal 90 is completed, whether communication is possible, or the like. The "Disconnected" indicates incapability of communication with the meeting-room terminal 90. The "Connected" indicates a state where communication can be confirmed within a fixed period. The "Before setup" indicates a state in which the initial settings have not been configured yet. The "Disconnected" indicates a state where no communication is performed for a fixed period or longer. The authentication key is authentication information used by the meeting management server 30 for authenticating the meeting-room terminal 90. By initial setting, the authentication key is transmitted to the meeting-room terminal 90, and the meeting-room terminal 90 stores the authentication key. At the time of communication, the meeting-room terminal 90 is authenticated by using the authentication key. The authentication key is a combination of numbers, alphabets, symbols, and the like that are too long to be identified by the brute force attack. The authentication key may be determined by the meeting management server 30 or the administrator. The management start flag indicates whether the meeting management server 30 starts management of the meeting room after completion of initial setting of the meeting-room terminal 90 (True: start, False: not start). The management start flag can prevent disadvantages generated by a time lag from the completion of initial setting until the disposition of the meeting-room terminal 90.

Registration Terminal:

The registration terminal 50 includes a communication unit 51, an operation accepting unit 52, and a display controller 53. Each of these functional units included in the registration terminal 50 is a function or means implemented by any of the components illustrated in FIG. 4 being operated in accordance with a command from the CPU 201 executing the program 209p that is loaded from the HDD 209 to the memory 202. The program 209p is distributed by being stored in a storage medium or is distributed from a server for program distribution.

The registration terminal 50 is a terminal used by the administrator for setting various settings regarding the meeting room via a web page provided by the meeting management server 30. Browser software operates on the registration terminal 50.

The communication unit 51 included in the registration terminal 50 transmits/receives various kinds of information to/from the meeting management server 30. For example, the communication unit 51 receives the meeting-room setting information of each meeting room and transmits information that is set by the administrator regarding the meeting room setting information.

The operation accepting unit 52 accepts various operations on the registration terminal 50. The display controller 53 analyzes various kinds of screen information from the meeting management server 30 and displays a screen on the LCD 206.

Figure 7B:
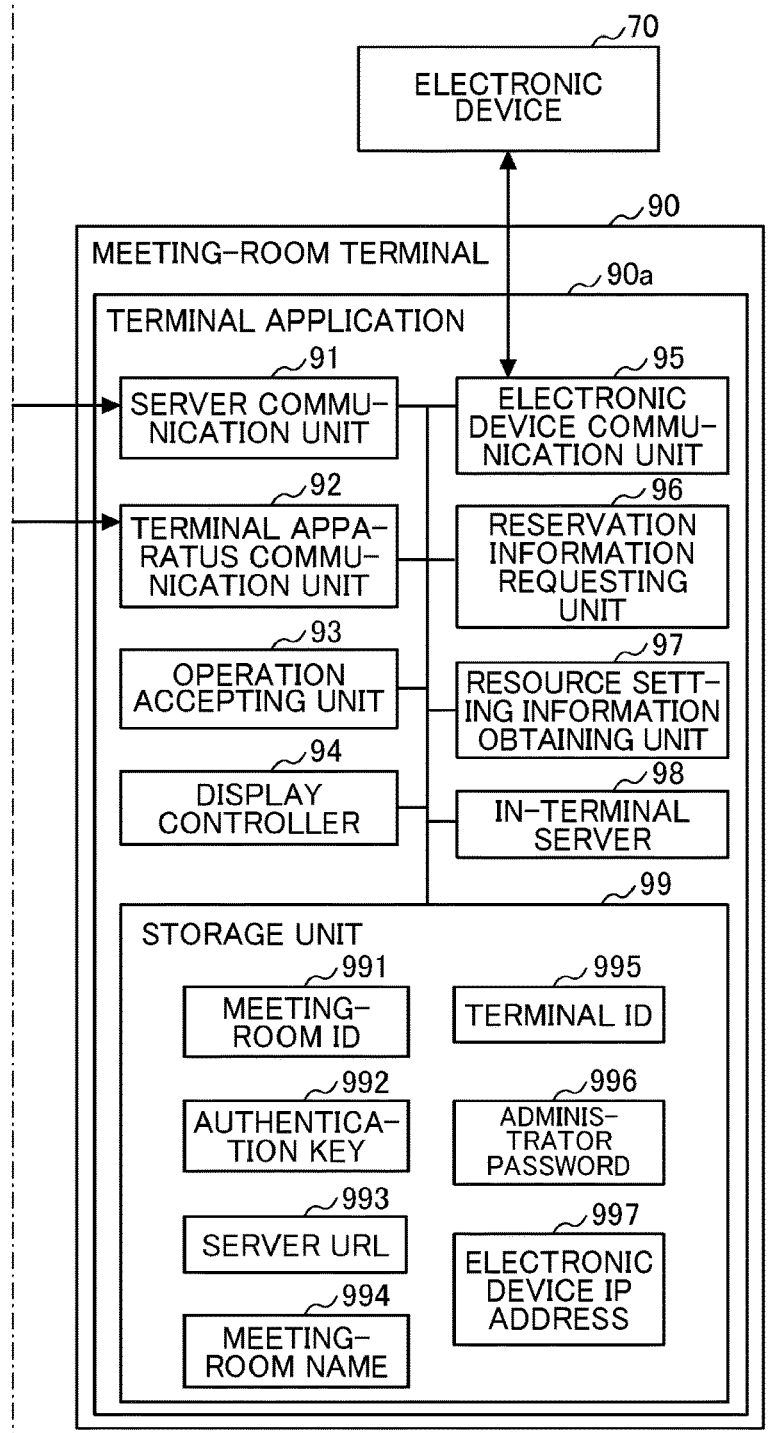

Terminal Device:

FIG. 7A and FIG. 7B are functional block diagrams illustrating an example of functional configurations of the terminal device 60 and the meeting-room terminal 90. Functions of the electronic device 70 will be described as necessary.

The terminal device 60 includes a communication unit 61a, an operation accepting unit 61b, a display controller 61c, a chat communication unit 62, a text display unit 63, an application communication unit 64, a server communication unit 65, a display controller 66, an application communication unit 67, and a terminal communication unit 68. Each of these functional units included in the terminal device 60 is a function or means implemented by any of the components illustrated in FIG. 4 being operated in accordance with a command from the CPU 201 executing the program 209p that is loaded from the HDD 209 to the memory 202. The program 209p is distributed by being stored in a storage medium or is distributed from a server for program distribution. Since a chat application 60a and a meeting application 60b operate on the terminal device 60, the program 209p includes the chat application 60a and the meeting application 60b.

The communication unit 61a transmits/receives various kinds of information to/from the meeting management server 30 and the reservation management server 20. The chat application 60a communicates with the chat server 10, and the meeting application 60b communicates with the meeting management server 30. Meanwhile, the communication unit 61a can communicate with any server. The communication unit 61a may be provided as, for example, a browser function.

The operation accepting unit 61b accepts various operations of participants on the terminal device 60. The display controller 61c interprets screen information of various screens and displays a screen on the LCD 206. The operation accepting unit 61*b* and the display controller 61*c* have, for example, a browser function and can execute a web application. For example, the display controller 61*c* displays a reservation setting screen received from the reservation management server 20, and the operation accepting unit 61*b* accepts reservation information that is set by the reserving person.

The chat communication unit 62 of the chat application 60*a* transmits/receives various kinds of information to/from the chat server 10. In this embodiment, the chat communication unit 62 receives the information regarding reservation of the meeting room 6 from the chat server 10 and notifies the chat server 10 that the information has been read, the meeting room 6 is to be used or cancelled, and the like.

The text display unit 63 of the chat application 60*a* displays text (the information regarding reservation of the meeting room 6) transmitted from the chat server 10. For example, the text is displayed as if the message sender is a bot and the bot inputs the text.

The application communication unit 64 of the chat application 60*a* calls the meeting application 60*b* and also transmits the meeting identification information to the meeting application 60*b*. When sending the information regarding reservation of the meeting room 6, since the chat server 10 has transmitted information for identifying the meeting application 60*b* to the terminal device 60, the chat application 60*a* designates the meeting application 60*b* and requests the OS to send the meeting identification information. The OS can start the meeting application 60*b*.

The server communication unit 65 of the meeting application 60*b* communicates with the meeting management server 30. A two-dimensional code including the meeting identification information is obtained from the meeting management server 30, for example. The two-dimensional code is used for authentication at the time of check-in. A several-digit number for authentication may alternatively be used.

The display controller 66 of the meeting application 60*b* displays the two-dimensional code including the meeting identification information or the like on the LCD 206. The application communication unit 67 of the meeting application 60*b* obtains various kinds of information (e.g., the meeting identification information included in the information regarding reservation of the meeting room 6) from the chat application 60*a* through the OS.

The terminal communication unit 68 communicates with the meeting-room terminal 90 and transmits the meeting identification information or the like. The terminal communication unit 68 detects the presence of the meeting-room terminal 90 by short-range wireless communication such as Bluetooth (registered trademark), and upon detection of the meeting-room terminal 90, transmits the meeting identification information. In addition, the terminal communication unit 68 provides a function of displaying the two-dimensional code (to be imaged) to the meeting-room terminal 90.

Meeting-Room Terminal:

The meeting-room terminal 90 includes a server communication unit 91, a terminal apparatus communication unit 92, an operation accepting unit 93, a display controller 94, an electronic device communication unit 95, a reservation information requesting unit 96, a resource setting information obtaining unit 97, and the in-terminal server 98. Each of these functional units included in the meeting-room terminal 90 is a function or means implemented by any of the components illustrated in FIG. 5 being operated in accordance with a command from the CPU 601 executing the program 604*p* that is loaded from the EEPROM 604 to the RAM 603. The program 604*p* includes the terminal application 90*a* and is distributed by being stored in a storage medium or is distributed from a server for program distribution. The terminal application 90*a* is installed in the meeting-room terminal 90, and thereby these functions are implemented.

Since the second meeting-room terminal 90B is newly provided, the terminal application 90*a* is not installed. Therefore, the functions illustrated in FIG. 7B are functions of the first meeting-room terminal 90A. The second meeting-room terminal 90B has none of the functions of the meeting-room terminal 90 illustrated in FIG. 7B. However, no problem arises even if the terminal application 90*a* is installed in advance.

The server communication unit 91 communicates with the meeting management server 30 by using a server URL 993 as an address. Since the meeting-room terminal 90 is present in an in-house network, it is difficult for the meeting management server 30 to establish communication with the meeting-room terminal 90. Thus, the meeting-room terminal 90 communicates with the meeting management server 30 by a communication technique such as polling (regularly communicating with the meeting management server 30) or Web Socket. The server communication unit 91 may perform communication using a communication protocol such as, but not limited to, Hypertext Transfer Protocol (HTTP) or the like.

The server communication unit 91 according to this embodiment receives reservation information and transmits, to the meeting management server 30, meeting identification information received by the terminal apparatus communication unit 92 from the terminal device 60 or meeting identification information manually input at the time of check-in. In addition, the server communication unit 91 receives control information from the meeting management server 30.

The terminal apparatus communication unit 92 communicates with the terminal device 60. In this embodiment, the terminal apparatus communication unit 92 receives the meeting identification information or the like. In a case where the meeting identification information is manually input, the terminal apparatus communication unit 92 may be omitted in some cases. The terminal apparatus communication unit 92 is implemented by the CPU 601 in FIG. 5 executing the program 604*p* to control the short-range wireless communication device 615 or the RF tag reader/writer 622, for example.

The operation accepting unit 93 accepts various operations on the meeting-room terminal 90. The display controller 94 displays the reservation information as a standby screen.

The electronic device communication unit 95 communicates with the electronic device 70. In this embodiment, the electronic device communication unit 95 transmits the control information received by the server communication unit 91 to the electronic device 70. The electronic device communication unit 95 is implemented by the CPU 601 in FIG. 5 executing the program 604*p* to control the wireless LAN communication device 613, for example.

At periodical timing for obtaining the reservation information, the reservation information requesting unit 96 repeatedly transmits, to the meeting management server 30, a meeting-room ID 991 and an authentication key 992 by using the server URL 993 stored in a storage unit 99 as an address through the server communication unit 91. As a response to this, the reservation information requesting unit 96 obtains the reservation information through the server communication unit 91. The reservation information may be obtained when any change is made. The timing is a period of a few seconds to a few minutes. The reservation information can be updated earlier if the period is shorter, but the communication load is higher. Thus, the period is determined balancing both points. In this embodiment, the period is 30 seconds, for example. In addition, for example, at least the meeting management information (the reservation information) of the meeting room 6 of the day can be received through the server communication unit 91.

The resource setting information obtaining unit 97 obtains the meeting-room setting information of each room through the server communication unit 91. That is, the resource setting information obtaining unit 97 obtains a meeting room list. The display controller 94 displays the meeting room list obtained by the resource setting information obtaining unit 97 on the display 616. In the meeting room list displayed on the display 616, the operation accepting unit 93 accepts selection of a meeting room from the administrator. That is, the operation accepting unit 93 accepts which meeting room's meeting-room setting information is to be set in the second meeting-room terminal 90B.

The in-terminal server 98 will be described with reference to FIG. 8.

In addition, the meeting-room terminal 90 includes the storage unit 99. The storage unit 99 is implemented by the ROM 602, the EEPROM 604, and the like in FIG. 5. The storage unit 99 stores the meeting-room ID 991, the authentication key 992, the server URL 993, a meeting-room name 994, a terminal ID 995, an administrator password 996, and an Internet protocol (IP) address 997 of the electronic device 70. Among them, the meeting-room ID 991, the authentication key 992, and the server URL 993 are communication setting information that is to be used for communication, and with the communication setting information, obtaining of the reservation information starts. In addition, the meeting-room name 994 is displayed on a standby screen and thus is preferably set in initial setting.

Figure 8:
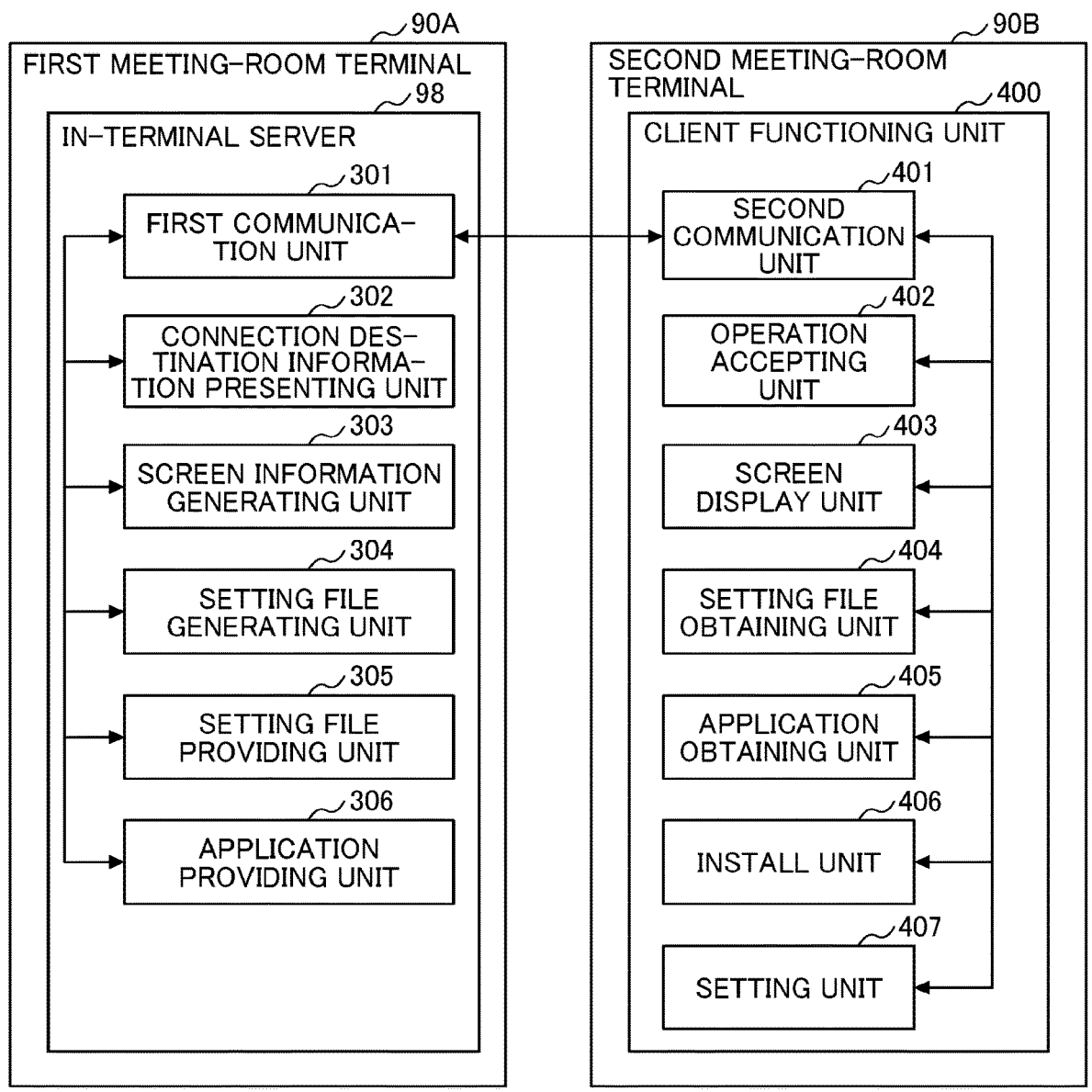
FIG. 8 is a block diagram illustrating an example of functional configurations of an in-terminal server and a client functioning unit, according to an embodiment of the present disclosure.

Functions of in-Terminal Server and Client Functioning Unit:

FIG. 8 is an example of a functional block diagram of the in-terminal server 98 and a client functioning unit 400. The in-terminal server 98 is a function of the first meeting-room terminal 90A, and the client functioning unit 400 is a function of the second meeting-room terminal 90B. The in-terminal server 98 is a function that the terminal application 90a originally has. Since the terminal application 90a is not installed in the second meeting-room terminal 90B yet, the client functioning unit 400 is a function that general-purpose browser software has.

The in-terminal server 98 enables the first meeting-room terminal 90A to provide functions of a web server to the second meeting-room terminal 90B. That is, the first meeting-room terminal 90A communicates with the second meeting-room terminal 90B using HTTP or the like, generates screen information described in Hypertext Markup Language (HTML), Cascade Style Sheet (CSS), JavaScript (registered trademark), or the like, and provides the screen information to the second meeting-room terminal 90B. In this embodiment, the first meeting-room terminal 90A provides the meeting-room setting information (and server URL of the meeting management server 30) of a meeting room obtained by the resource setting information obtaining unit 97 and the terminal application 90a to the second meeting-room terminal 90B.

The in-terminal server 98 includes a first communication unit 301, a connection destination information presenting unit 302, a screen information generating unit 303, a setting file generating unit 304, a setting file providing unit 305, and an application providing unit 306.

The first communication unit 301 waits for communication from the second meeting-room terminal 90B, which is a client, as a web server, and transmits screen information, an application, and a setting file that are requested by the second meeting-room terminal 90B to the second meeting-room terminal 90B.

The connection destination information presenting unit 302 generates connection destination information by which the second meeting-room terminal 90B is connected to the in-terminal server 98 of the first meeting-room terminal 90A and displays the connection destination information on the display 616 of the first meeting-room terminal 90A.

The screen information generating unit 303 generates screen information of a screen displayed by the second meeting-room terminal 90B. That is, the screen information generating unit 303 generates screen information requested by an HTTP request and to be transmitted to the second meeting-room terminal 90B as an HTTP response.

The setting file generating unit 304 generates a setting file on the basis of the meeting-room setting information and the server URL of a meeting room selected by the administrator. The meeting-room setting information of each meeting room is obtained by the resource setting information obtaining unit 97 from the meeting management server 30. The server URL is the URL of the meeting management server 30 and thus is obtained from the meeting management server 30 together with the meeting-room setting information. The server URL is also held in the storage unit 99 of the first meeting-room terminal 90A and thus may also be used.

The setting file providing unit 305 transmits the setting file to the second meeting-room terminal 90B through the first communication unit 301.

The application providing unit 306 provides the terminal application 90a to the second meeting-room terminal 90B through the first communication unit 301. Instead of the terminal application 90a itself, link information to the terminal application 90a may be provided.

The client functioning unit 400 of the second meeting-room terminal 90B includes a second communication unit 401, an operation accepting unit 402, a screen display unit 403, a setting file obtaining unit 404, an application obtaining unit 405, an install unit 406, and a setting unit 407. The client functioning unit 400 having these functions is implemented by browser software. Even if the terminal application 90a is not installed in the second meeting-room terminal 90B, since browser software is installed, the terminal application 90a and the setting file can be obtained by using this function.

The second communication unit 401 of the second meeting-room terminal 90B generates an HTTP request as a client and communicates with the in-terminal server 98 of the first meeting-room terminal 90A. The second communication unit 401 receives, as an HTTP response, screen information used by the administrator to operate the second meeting-room terminal 90B. In addition, the second communication unit 401 receives the terminal application 90a and the setting tile of a meeting room selected by the administrator.

The operation accepting unit 402 accepts various operations on the second meeting-room terminal 90B. On the basis of the screen information received by the second communication unit 401, the screen display unit 403 displays a screen used by the administrator to operate the second meeting-room terminal 90B on the display 616.

The setting file obtaining unit 404 obtains the setting file of a meeting room selected by the administrator from the in-terminal server 98. The application obtaining unit 405 obtains the terminal application 90a from the first meeting-room terminal 90A or the link destination. The install unit 406 installs the terminal application 90a in the second meeting-room terminal 90B.

The setting unit 407 sets the setting file obtained by the setting file obtaining unit 404 in the storage unit 99.

Figure 9:
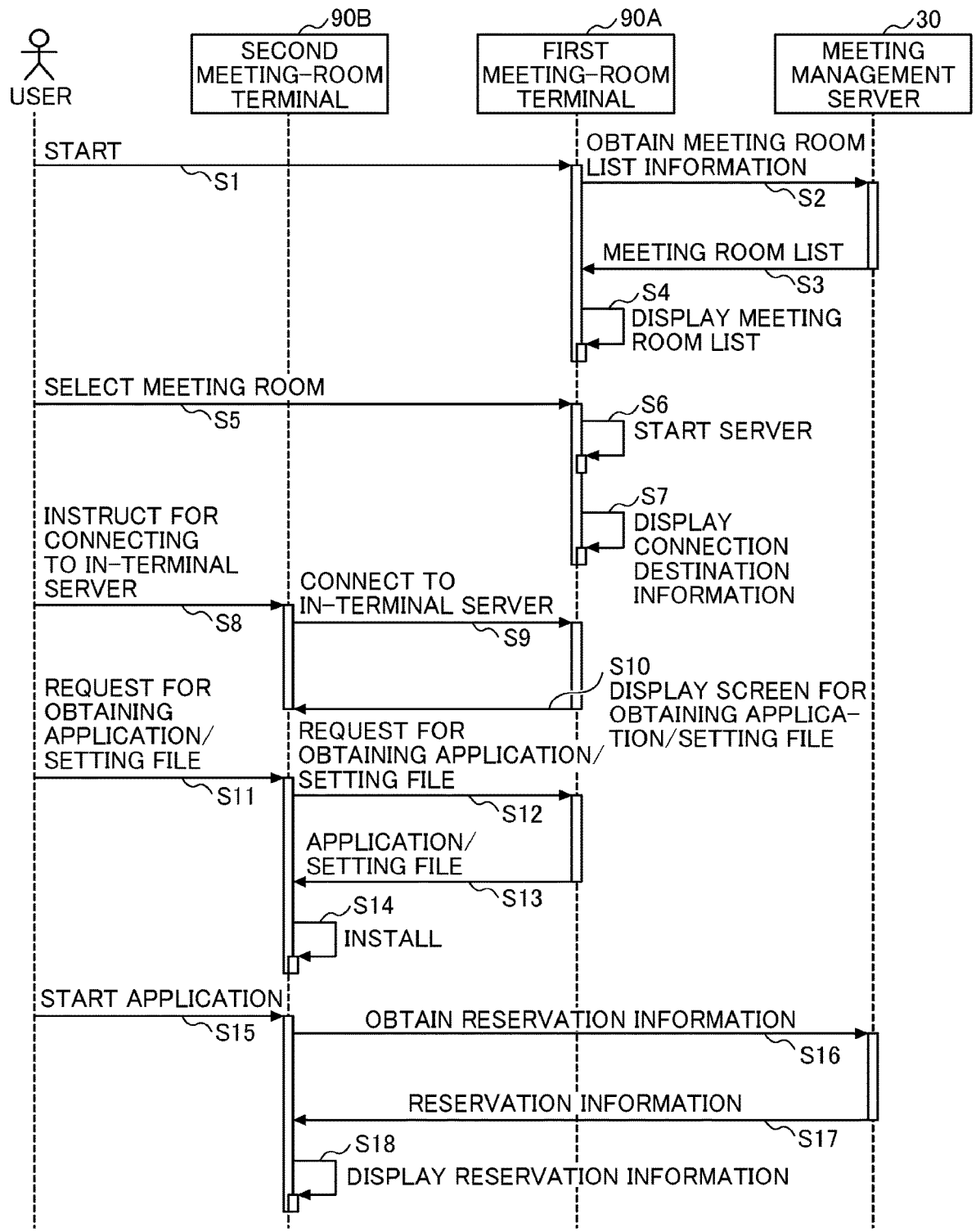
FIG. 9 is a sequence illustrating an example of a procedure in which an administrator configures a setting file in the second meeting-room terminal, according to an embodiment of the present disclosure.

Operation Procedure:

FIG. 9 is an example of a sequence illustrating a procedure in which an administrator sets a setting file in the second meeting-room terminal 90B. The first meeting-room terminal 90A has already established communication with the meeting management server 30 and displays a standby screen. The second meeting-room terminal 90B is in a state where general-purpose browser software is installed. Note that screen examples in FIG. 10 and FIG. 11 will be referred to as appropriate.

S1: First, the administrator operates the first meeting-room terminal 90A and performs an operation for displaying a meeting room list. The operation accepting unit 93 of the first meeting-room terminal 90A accepts this operation (see an illustration (b) of FIG. 10).

S2: The server communication unit 91 of the first meeting-room terminal 90A requests the meeting room list managed by the meeting management server 30.

S3: The receiving unit 31b of the meeting management server 30 receives the request for the meeting room list, and the resource information providing unit 40 obtains meeting-room setting information of each meeting room from the meeting-room setting information DB 498. The resource information providing unit 40 obtains information required for configuring initial setting of the second meeting-room terminal 90B. In this embodiment, a meeting-room name, a terminal ID, and an authentication key of each meeting room are obtained. The transmitting unit 31a of the meeting management server 30 transmits the meeting-room information (the meeting-room name, the terminal ID, and the authentication key) of each meeting room to the first meeting-room terminal 90A.

S4: The first communication unit 301 of the first meeting-room terminal 90A receives the meeting-room information of each meeting room, and the display controller 94 displays the meeting room list on the display 616 (see an illustration (c) of FIG. 10).

S5: Subsequently, from the meeting room list, the administrator selects a meeting room in which the second meeting-room terminal 90B is to be provided. The operation accepting unit 93 of the first meeting-room terminal 90A accepts selection of the meeting room. That is, the administrator selects the meeting room for which the second meeting-room terminal 90B is to obtain reservation information.

S6: Upon acceptance of selection of the meeting room, the first meeting-room terminal 90A starts the in-terminal server 98. To start the in-terminal server 98 means to set a state where a server can execute typical processing, such as designating a port number of the Transmission Control Protocol (TCP) to generate a socket (set the socket in a standby state), analyzing, if the socket receives an HTTP request, the HTTP request and detecting an HTTP method and a designated file or program, generating a status and a header of an HTTP response, or storing a processing result of the designated file or program in a body of the HTTP response. In this embodiment, the body of the response includes the screen information of a screen to be displayed by the second meeting-room terminal 90B, the terminal application 90a, the setting file, and the like.

Start of a server by the first meeting-room terminal 90A enables the second meeting-room terminal 90B to communicate with the first meeting-room terminal 90A by using general-purpose browser or the like.

S7: Upon start of the in-terminal server 98, the connection destination information presenting unit 302 of the first meeting-room terminal 90A presents connection destination information (see an illustration (d) of FIG. 10). The connection destination information is a URL used by the second meeting-room terminal 90B to be connected to the in-terminal server 98. An IP address or a domain name included in the URL is assigned to the first meeting-room terminal 90A, and the port number is determined in step S6. Furthermore, a folder including the meeting-room setting information of the selected meeting room or a file pass including the meeting-room setting information may be designated, or the meeting-room ID of the selected meeting room may be included in the URL. However, in this embodiment, even if the connection destination information does not have information regarding the meeting room, since merely the setting file of the meeting room selected by the administrator can be downloaded with this URL, and the URL does not necessarily include the information regarding the meeting room.

To present something mainly means to display something on the display 616, but may mean to transmit something to an email address of the administrator, for example.

In addition, the setting file generating unit 304 of the in-terminal server 98 generates the meeting-room setting information of the meeting room selected by the administrator and the setting file on the basis of the server URL obtained from the meeting management server 30 or stored in the storage unit 99.

Although the first meeting-room terminal 90A starts the in-terminal server 98 in response to the administrator's selection of a meeting room in this embodiment, the first meeting-room terminal 90A may display a button or the like on the standby screen and may start the in-terminal server 98 in response to pressing of the button. In this case, after start of the in-terminal server 98, the administrator selects a meeting room. For example, after the second meeting-room terminal 90B is connected to the in-terminal server 98 of the first meeting-room terminal 90A, the administrator may select a meeting room in the meeting room list displayed by the second meeting-room terminal 90B.

S8: Subsequently, the administrator starts browser software in the second meeting-room terminal 90B and inputs the presented connection destination information. The operation accepting unit 402 of the second meeting-room terminal 90B accepts the connection destination information (see an illustration (a) of FIG. 11).

The connection destination information is preferably provided in the form of an image code such as a QR code (registered trademark) or a barcode. Since the image code includes the connection destination information, the administrator images the image code with the second meeting-room terminal 90B to access the in-terminal server 98. Alternatively, the connection destination information may be distributed wirelessly by Bluetooth (registered trademark), Near-Field Communication (NFC), infrared communication, visible light communication, or the like.

S9: In accordance with the connection destination information, the second communication unit 401 of the second meeting-room terminal 90B communicates with the in-terminal server 98 of the first meeting-room terminal 90A.

S10: Being connected to the connection destination, the first communication unit 301 of the first meeting-room terminal 90A generates screen information of a screen to be used by the screen information generating unit 303 to download the terminal application 90a and the setting file. The first communication unit 301 transmits this screen information to the second meeting-room terminal 90B. This screen information may be a predetermined fixed screen, but preferably displays the meeting-room name and other information.

The second communication unit 401 of the second meeting-room terminal 90B receives the screen information and displays the screen to be used by the screen display unit 403 to download the terminal application 90a and the setting file on the display 616 (see an illustration (b) of FIG. 11).

S11: The administrator selects to download the terminal application 90a and the setting file on the screen. The operation accepting unit 402 of the second meeting-room terminal 90B accepts the selection.

S12: The setting file obtaining unit 404 of the second meeting-room terminal 90B transmits, to the first meeting-room terminal 90A, a download request of the setting file through the second communication unit 401, and the application obtaining unit 405 transmits, to the first meeting-room terminal 90A, a download request of the terminal application 90a through the second communication unit 401.

S13: The first communication unit 301 of the first meeting-room terminal 90A receives the download requests of the terminal application 90a and the setting file. The application providing unit 306 transmits the terminal application 90a in an installable format to the second meeting-room terminal 90B through the first communication unit 301, and the setting file providing unit 305 transmits the setting file generated by the setting file generating unit 304 to the second meeting-room terminal 90B through the first communication unit 301. The terminal application 90a and the setting file are preferably transmitted in a compiled state. The compiled state means to be compressed in a zip file or the like. This can shorten the communication time.

Note that the terminal application 90a provided by the first meeting-room terminal 90A may be held by the first meeting-room terminal 90A in the storage unit 99 or may be obtained by being connected to an external server. In addition, a link to an external server may be provided to the second meeting-room terminal 90B, and the second meeting-room terminal 90B may access the link destination to obtain the terminal application 90a.

S14: The application obtaining unit 405 of the second meeting-room terminal 90B obtains the terminal application 90a through the second communication unit 401, and the setting file obtaining unit 404 obtains the setting file through the second communication unit 401. The install unit 406 of the second meeting-room terminal 90B installs the terminal application 90a in the second meeting-room terminal 90B. In addition, the setting unit 407 sets the setting file in the storage unit 99 (see an illustration (c) of FIG. 11). By installing the application, the second meeting-room terminal 90B also has a function to operate as a server and can provide the setting file and the terminal application 90a to another new meeting-room terminal 90.

The setting file includes a unique meeting-room ID for identifying a meeting room, and the server URL and the authentication key are included. Thus, the second meeting-room terminal 90B can communicate with the meeting management server 30. In addition, since the setting file includes the meeting-room name, the meeting-room name can be displayed on the standby screen.

S15: The administrator starts the terminal application 90a installed in the second meeting-room terminal 90B.

S16: The reservation information requesting unit 96 of the terminal application 90a transmits the meeting-room ID and the authentication key to the meeting management server 30 by using the server URL as an address and requests reservation information.

S17: The receiving unit 31b of the meeting management server 30 authenticates the second meeting-room terminal 90B by using the meeting-room ID and the authentication key. If a management start flag is True, the reservation information transmitting unit 41 of the meeting management server 30 transmits the reservation information of the meeting room identified by the meeting-room ID to the second meeting-room terminal 90B.

S18: The server communication unit 91 of the second meeting-room terminal 90B receives the reservation information, and the display controller 94 displays the standby screen including the reservation information (see an illustration (d) of FIG. 11).

Screen Examples Until Downloading Setting File:

Screen examples of the first meeting-room terminal 90A and screen examples of the second meeting-room terminal 90B will be described with reference to FIG. 10 and FIG. 11. FIG. 10 illustrates screen examples displayed by the first meeting-room terminal 90A, and FIG. 11 illustrates screen examples displayed by the second meeting-room terminal 90B.

An illustration (a) of FIG. 10 is an example of a standby screen. A standby screen 701 is a screen used by a participant of a meeting to check in a meeting room. The standby screen 701 includes a meeting-room name 702, a current meeting-room status 703, a next reservation status 704, a quick use button 705, a setting button 706, and the like.

If an administrator presses the setting button 706, the first meeting-room terminal 90A displays a setting screen 711 as the illustration (b) of FIG. 10. The setting screen 711 is a screen on which various settings of the meeting-room terminal 90 can be set and is displayed by inputting an administrator password. This prevents the setting from being overwritten. On the setting screen 711 as the illustration (b) of FIG. 10, a "tablet setting function" button 712 is displayed. The "tablet setting function" button 712 is a button used for displaying a meeting room list.

The illustration (c) of FIG. 10 is an example of a meeting-room list screen 721 displayed in response to pressing of the "tablet setting function" button 712. On the meeting-room list screen 721, a meeting room list 722 of meeting rooms to which the second meeting-room terminal 90B can be associated is displayed. There is no specific limitation on the meeting room, and any meeting room managed by the meeting management server 30 can be displayed; however, the meeting management server 30 can refrain from transmitting meeting-room setting information of a specific meeting room to the first meeting-room terminal 90A. For example, a meeting room for an executive room, a meeting room mainly used by a guest, or the like may be excluded.

The administrator selects a meeting room in which the administrator wishes to provide the second meeting-room terminal 90B. Thus, this meeting room is not limited to a meeting room in which the first meeting-room terminal 90A is provided.

The illustration (d) of FIG. 10 is an example of a connection destination information display screen 731 displayed if a meeting room is selected. On the connection destination information display screen 731, a message 732 saying "Access URL below with tablet to set up" and a URL 733 (connection destination information) are displayed. The administrator inputs the URL 733 to the second meeting-room terminal 90B.

Note that an image code including a link destination of the setting file and the terminal application 90a may also be displayed on the connection destination information display screen 731 of the illustration (d) of FIG. 10. If the administrator images the image code with the second meeting-room terminal 90B, the setting file and the terminal application 90a can be obtained.

An illustration (a) of FIG. 11(a) is an example of a browser screen 741 displayed by a browser of the second meeting-room terminal 90B. The administrator inputs the URL displayed on the screen as illustrated in the illustration (d) of FIG. 10.

If the administrator performs an operation to connect to the URL, the second meeting-room terminal 90B receives screen information from the first meeting-room terminal 90A and displays a download screen 751 as illustrated in the illustration (b) of FIG. 11. On the download screen 751, a "download application and setting file" button 752 is displayed. If the administrator presses the "download application and setting file" button 752, the second meeting-room terminal 90B downloads the application and the setting file. If download is completed and the administrator performs an operation for installing the application, the application is installed.

The illustration (c) of FIG. 11 illustrates a start inquiry dialog 761 displayed if the application is installed. In the start inquiry dialog 761, a massage 762 asking "Application has been installed. Start application?", an OK button 763, and a cancel button 764 are displayed. If the administrator presses the OK button 763, the terminal application 90a starts.

The illustration (d) of FIG. 11 is an example of the standby screen 701 on which, after the terminal application 90a has started, the reservation information obtained from the meeting management server 30 is displayed. The reservation information displayed on the standby screen 701 in the illustration (d) of FIG. 11 and the reservation information displayed on the standby screen 701 in the illustration (a) of FIG. 10 are the same. This is because the administrator has selected on the screen in the illustration (c) of FIG. 10 the same meeting room as the meeting room with which the first meeting-room terminal 90A is associated. In this manner, the meeting-room terminal 90 associated with the same meeting room can be prepared easily, and thus, it is easy to prepare a meeting-room terminal for update or backup of the meeting-room terminal.

As described heretofore, in the resource reservation system according to this embodiment, it is not required to manually configure initial settings for each item, and the second meeting-room terminal 90B can succeed the setting file from the first meeting-room terminal 90A. In addition, the administrator can set the setting file even in a state where the meeting management server 30 has nothing to do with the second meeting-room terminal 90B and the terminal application is not installed in the second meeting-room terminal 90B.

In the related art, it is not possible to use a preexisting information processing terminal as a server.

According to one or more embodiments of the present disclosure, a resource reservation system can configure settings of a new information processing terminal using a preexisting information processing terminal like a server.

Variations:

An embodiment of the present disclosure has been described above. However, the present disclosure is not limited to the embodiment, and various modifications and substitutions may be made without departing from the spirit of the present disclosure.

For example, the initial setting has been described as an example in the embodiment. However, the setting method according to the embodiment is not limited to that for initial setting. The present disclosure is applicable to a case where the second meeting-room terminal 90B in which certain setting is already set succeeds at least part of setting of the first meeting-room terminal 90A.

In addition, other than the setting, the second meeting-room terminal 90B can also succeed various kinds of information (e.g., address book, Internet browsing history, and operation log) held by the first meeting-room terminal 90A.

In addition, a plurality of meeting management servers 30 may be present, and the functions of the meeting management server 30 may be dispersed to a plurality of servers. Furthermore, the reservation management server 20 and the meeting management server 30 may be integrated.

In addition, the resource reservation system 100 according to the embodiment may also be referred to as a "web service". Examples of the web service include various rental services such as a meeting room rental service. A system using the web service is referred to as a "use system".

In addition, the functional configuration of the resource reservation system 100 are divided into the functional blocks as illustrated in FIG. 6, FIG. 7A and FIG. 7B, for example, based on main functions thereof, in order to facilitate understanding the processes performed by the resource reservation system 100. No limitation is intended by how the processes are divided or by the name of the processes. The resource reservation system 100 can also be divided into the larger number of units according to the processing contents. Further, one process can be divided to include the larger number of processes.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

For example, the meeting-room terminal 90 may be an output device such as a projector (PJ), an interactive white board (IWB; an electronic whiteboard with mutual communication capability) and a digital signage, a head-up display (HUD) device, an industrial machine, an imaging device, a sound collecting device, a medical device, a networked home appliance, a laptop personal computer (PC), a mobile phone, a smartphone, a tablet terminal, a game console, a personal digital assistant (PDA), a digital camera, a wearable PC, a desktop PC, or the like.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

What is claimed is:

1. A resource reservation system, comprising:
an information processing apparatus configured to manage reservation information regarding reservation of at least one resource; and
a first information processing terminal configured to display the reservation information of a resource in which the first information processing terminal is provided, the reservation information being obtained from the information processing apparatus,
wherein the first information processing terminal includes first circuitry configured to:
obtain resource setting information regarding setting of a second information processing terminal from the information processing apparatus;
obtain selection of a particular resource of the at least one resource;
initiate implementation of an in-terminal server that communicates as a server with the second information processing terminal, and
wherein the second information processing terminal includes browser software that when executed by second circuitry of the second information processing terminal causes the second circuitry to:
obtain a setting file generated from the resource setting information from the first information processing terminal, when the second information processing terminal communicates with the in-terminal server of the first information processing terminal, wherein the setting file includes information to be used to obtain reservation information of the selected particular resource from the information processing apparatus; and
set the setting file in the second information processing terminal.

2. The resource reservation system of claim 1, wherein the setting file includes a uniform resource locator (URL) of the information processing apparatus.

3. The resource reservation system according of claim 1, wherein the setting file includes an authentication key for being authenticated by the information processing apparatus.

4. The resource reservation system of claim 1, wherein the setting file includes a name of the particular resource.

5. The resource reservation system of claim 1, wherein the browser software when executed by the second circuitry of the second information processing terminal further causes the second circuitry to obtain, when the second information processing terminal communicates with the in-terminal server of the first information processing terminal, from the first information processing terminal, an application for obtaining the reservation information from the information processing apparatus or a link for obtaining the application, and
wherein, the second information processing terminal stalls the application in the second information processing terminal, and when the application is activated, the second information processing terminal obtains the reservation information from the information processing apparatus by using the setting file.

6. The resource reservation system according of claim 5, wherein, when the second information processing terminal communicates with the in-terminal server of the first information processing terminal, the second information processing terminal obtains the application and the setting file in a compiled state from the first information processing terminal.

7. The resource reservation system of claim 5, wherein the second information processing terminal in which the application is installed has a function of the in-terminal server.

8. The resource reservation system of claim 1,
wherein, when the first circuitry of the first information processing terminal obtains resource setting information regarding setting of the second information processing terminal from the information processing apparatus, the first information processing terminal displays a list of resources on a display, and
wherein, in response to receiving a selection of the particular resource from the list of resources, the first information processing terminal presents connection destination information used for connecting to the in-terminal server of the first information processing terminal.

9. The resource reservation system of claim 8,
wherein the first information processing terminal presents the connection destination information used for connecting to the in-terminal server of the first information processing terminal, and
wherein the second information processing terminal wirelessly receives the connection destination information and communicates with the in-terminal server of the first information processing terminal connected by using the connection destination information.

10. The resource reservation system of claim 1,
wherein each of the first information processing terminal and the second information processing terminal has a function of obtaining the reservation information of a same resource from the information processing apparatus.

11. The resource reservation system of claim 1,
wherein when the first information processing terminal obtains a list of resources from the information processing apparatus in accordance with an operation of an administrator and accepts a selection of the particular resource from the list of resources, the first information processing terminal presents connection destination information used for connecting to the in-terminal server of the first information processing terminal, and
wherein the second information processing terminal communicates with the in-terminal server of the first information processing terminal by using the connection destination information that is input by the administrator, obtains an application and the setting file for obtaining the reservation information from the in-terminal server of the first information processing terminal, and installs the application and starts the application to start obtaining the reservation information from the information processing apparatus by using the setting file.

12. The resource reservation system of claim 1, wherein the second information processing terminal is configured to obtain the setting file independently of the information processing apparatus that manages the reservation information.

13. The resource reservation system of claim 1, wherein the first and second information processing terminals are mobile terminals, and the second information processing terminal obtains the setting file from the first information processing terminal while located in a meeting room corresponding to the particular resource.

14. The resource reservation system of claim 1, wherein the information to be used to obtain the reservation information of the selected particular resource, which is included in the setting file obtained by the second circuitry, is an identifier identifying the selected particular resource.

15. A setting method performed by a resource reservation system including an information processing apparatus configured to manage reservation information regarding reservation of at least one resource and a first information processing terminal configured to display the reservation information of a resource in which the first information processing terminal is provided, the reservation information being obtained from the information processing apparatus, the setting method comprising:
    obtaining, by the first information processing terminal, resource setting information regarding setting of a second information processing terminal from the information processing apparatus;
    obtaining selection of a particular resource of the at least one resource;
    initiating implementation, by the first information processing terminal, of in-terminal server configured to communicate as a server with the second information processing terminal;
    obtaining, by the second information processing terminal, when the second information processing terminal communicates with the in-terminal server of the first information processing terminal a setting file generated from the resource setting information from the first information processing terminal, wherein the setting file includes information to be used to obtain reservation information of the selected particular resource from the information processing apparatus; and
    setting, by the second information processing terminal, the setting file in the second information processing terminal.

16. A non-transitory computer readable storage medium storing a program for causing a first information processing terminal configured to display, reservation information of a resource in which the first information processing terminal is provided, the reservation information including information regarding reservation of at least one resource obtained from an information processing apparatus configured to manage the reservation information to perform a method comprising:
    obtaining resource setting information regarding setting of a second information processing terminal from the information processing apparatus;
    obtaining selection of a particular resource of the at least one resource;
    initiating implementation of an in-terminal server to communicate with the second information processing terminal; and
    providing, when the second information processing terminal communicates with the in-terminal server of the first information processing terminal, a setting file generated from the resource setting information to the second information processing terminal configured to set the setting file, wherein the setting file includes information to be used to obtain reservation information of the selected particular resource from the information processing apparatus.

* * * * *